United States Patent
Wang et al.

(10) Patent No.: US 12,039,995 B2
(45) Date of Patent: Jul. 16, 2024

(54) AUDIO SIGNAL PROCESSING METHOD AND APPARATUS, ELECTRONIC DEVICE, AND STORAGE MEDIUM

(71) Applicant: Tencent Technology (Shenzhen) Company Limited, Shenzhen (CN)

(72) Inventors: Jun Wang, Shenzhen (CN); Wingyip Lam, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 156 days.

(21) Appl. No.: 17/667,370

(22) Filed: Feb. 8, 2022

(65) Prior Publication Data

US 2022/0165288 A1    May 26, 2022

Related U.S. Application Data

(63) Continuation of application No. PCT/CN2020/124132, filed on Oct. 27, 2020.

(30) Foreign Application Priority Data

Jan. 2, 2020   (CN) .......................... 202010001636.3

(51) Int. Cl.
  *G10L 21/0308*    (2013.01)
  *G10L 13/02*    (2013.01)
  (Continued)

(52) U.S. Cl.
  CPC .......... *G10L 21/0308* (2013.01); *G10L 13/02* (2013.01); *G10L 17/02* (2013.01);
  (Continued)

(58) Field of Classification Search
  CPC ..... G10L 21/0308; G10L 13/02; G10L 17/02; G10L 17/04; G10L 17/06; G10L 17/22;
  (Continued)

(56) References Cited

U.S. PATENT DOCUMENTS

| | | | |
|---|---|---|---|
| 6,832,194 B1 | 12/2004 | Mozer et al. | |
| 10,585,989 B1 * | 3/2020 | Ahmed | G06N 3/045 |

(Continued)

FOREIGN PATENT DOCUMENTS

| | | |
|---|---|---|
| CN | 108922518 A | 11/2018 |
| CN | 108960407 A | 12/2018 |

(Continued)

OTHER PUBLICATIONS

Extended European Search Report, EP20909391.3, Oct. 17, 2022, 8 pgs.

(Continued)

*Primary Examiner* — Pierre Louis Desir
*Assistant Examiner* — Keisha Y. Castillo-Torres
(74) *Attorney, Agent, or Firm* — Morgan, Lewis & Bockius LLP

(57) ABSTRACT

This application discloses an audio signal processing method performed by an electronic device. According to this application, embedding processing is performed on a mixed audio signal by mapping the mixed audio signal to an embedding space, to obtain an embedding feature of the mixed audio signal in the embedding space; and generalized feature extraction is performed on the embedding feature, so that a generalized feature of a target component in the mixed audio signal can be obtained through extraction. The generalized feature of the target component has good generalization capability and expression capability, and can be used for different scenarios. Audio signal processing is performed on the mixed audio signal based on the generalized feature of the target component to obtain information of the audio signal of the target object, thereby improving the robustness and generalization of an audio signal processing process, and improving the accuracy of audio signal processing.

15 Claims, 4 Drawing Sheets

(51) Int. Cl.
*G10L 17/02* (2013.01)
*G10L 17/04* (2013.01)
*G10L 17/06* (2013.01)
*G10L 17/22* (2013.01)
*G10L 21/0208* (2013.01)
*G10L 21/0232* (2013.01)

(52) U.S. Cl.
CPC .............. *G10L 17/04* (2013.01); *G10L 17/06* (2013.01); *G10L 17/22* (2013.01); *G10L 2021/02087* (2013.01); *G10L 21/0232* (2013.01)

(58) Field of Classification Search
CPC ....... G10L 21/0232; G10L 2021/02087; G10L 21/0272; G10L 15/00; G10L 17/00; G10L 25/30; G10L 21/0208; G10L 2021/02082; G06N 3/044; G06N 3/045; G06N 7/01; G06N 3/088; G06N 5/041
See application file for complete search history.

(56) References Cited

U.S. PATENT DOCUMENTS

| | | |
|---|---|---|
| 2011/0313953 A1 | 12/2011 | Lane et al. |
| 2018/0358003 A1* | 12/2018 | Calle ................... G10L 15/063 |
| 2019/0318725 A1* | 10/2019 | Le Roux ................. G10L 15/16 |
| 2019/0318754 A1 | 10/2019 | Le Roux et al. |
| 2019/0378006 A1 | 12/2019 | Fukuda et al. |
| 2020/0043467 A1* | 2/2020 | Qian ..................... G06N 3/044 |
| 2020/0152330 A1* | 5/2020 | Anushiravani .......... A61B 5/11 |

FOREIGN PATENT DOCUMENTS

| | | |
|---|---|---|
| CN | 109523994 A | 3/2019 |
| CN | 109637546 A | 4/2019 |
| CN | 110288979 A | 9/2019 |
| CN | 110459237 A | 11/2019 |
| CN | 110459240 A | 11/2019 |
| CN | 110619887 A | 12/2019 |
| CN | 111179961 A | 5/2020 |

OTHER PUBLICATIONS

Tencent Technology, WO, PCT/CN2020/124132, Jan. 28, 2021, 5 pgs.
Tencent Technology, IPRP, PCT/CN2020/124132, Jul. 5, 2022, 6 pgs.
Tencent Technology, ISR, PCT/CN2020/124132, Jan. 28, 2021, 2 pgs.

* cited by examiner

AUDIO SIGNAL PROCESSING METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2020/124132, entitled "AUDIO SIGNAL PROCESSING METHOD AND APPARATUS, ELECTRONIC DEVICE, AND STORAGE MEDIUM" filed on Oct. 27, 2020, which claims priority to Chinese Patent Application No. 202010001636.3, filed with the State Intellectual Property Office of the People's Republic of China on Jan. 2, 2020, and entitled "AUDIO SIGNAL PROCESSING METHOD AND APPARATUS, ELECTRONIC DEVICE, AND STORAGE MEDIUM", all of which are incorporated herein by reference in their entirety.

FIELD OF THE TECHNOLOGY

This application relates to the field of signal processing technologies, and in particular, to an audio signal processing method and apparatus, an electronic device, and a storage medium.

BACKGROUND OF THE DISCLOSURE

In the field of signal processing, the "cocktail party problem" is a hot research topic: given a mixed audio signal (there are two or more speakers), how to separate an independent audio signal of each speaker talking at the same time at the cocktail party? The solution to the cocktail party problem is referred to as the speech separation technology. At present, speech separation is generally performed by using a supervised learning-based deep model. For example, supervised learning-based deep models include a deep clustering (DPCL) network, a deep attractor network (DANet), an anchored deep attractor network (ADANet), an online deep attractor network (ODANet), and the like.

In the foregoing process, supervised learning refers to training, for a specific scenario, a deep model for speech separation in the corresponding scenario after obtaining labeled training data. In practical applications, for audio signals not labeled during training, the supervised learning-based deep model has relatively poor robustness and generalization, resulting in poor accuracy of the supervised learning-based deep model when processing the audio signals in other scenarios than the training scenario.

SUMMARY

Embodiments of this application provide an audio signal processing method and apparatus, an electronic device, and a storage medium, which can improve the accuracy of an audio signal processing process. The technical solutions are as follows:

According to an aspect, an audio signal processing method is performed by an electronic device, the method including:

performing embedding processing on a mixed audio signal by mapping the mixed audio signal to an embedding space, to obtain an embedding feature of the mixed audio signal in the embedding space;

performing generalized feature extraction on the embedding feature, to obtain a generalized feature of a target component in the mixed audio signal, the target component being corresponding to an audio signal of a target object in the mixed audio signal; and performing audio signal processing on the mixed audio signal based on the generalized feature of the target component to obtain information of the audio signal of the target object in the mixed audio signal.

In some embodiments, the performing generalized feature extraction on the embedding feature, to obtain a generalized feature of a target component in the mixed audio signal includes:

performing recursive weighting processing on the embedding feature, to obtain the generalized feature of the target component.

In some embodiments, the performing embedding processing on a mixed audio signal by mapping the mixed audio signal to an embedding space, to obtain an embedding feature of the mixed audio signal includes:

inputting the mixed audio signal into an encoder network, and performing embedding processing on the mixed audio signal by mapping the mixed audio signal to the embedding space using the encoder network, to obtain the embedding feature of the mixed audio signal; and the performing generalized feature extraction on the embedding feature, to obtain a generalized feature of a target component in the mixed audio signal includes:

inputting the embedding feature into an abstractor network, and performing generalized feature extraction on the embedding feature by using the abstractor network, to obtain the generalized feature of the target component in the mixed audio signal.

In some embodiments, the abstractor network is an autoregressive model, and the inputting the embedding feature into an abstractor network, and performing generalized feature extraction on the embedding feature by using the abstractor network, to obtain the generalized feature of the target component in the mixed audio signal includes:

inputting the embedding feature into the autoregressive model, and performing recursive weighting processing on the embedding feature by using the autoregressive model, to obtain the generalized feature of the target component.

In some embodiments, the method further includes:

performing collaborative iterative training on a teacher model and a student model based on an unlabeled sample mixed signal, to obtain the encoder network and the abstractor network, where the student model includes a first encoder network and a first abstractor network, the teacher model includes a second encoder network and a second abstractor network, an output of the first encoder network is used as an input of the first abstractor network, an output of the second encoder network is used as an input of the second abstractor network, and the teacher model in each iteration process is obtained by weighting the teacher model in a previous iteration process and the student model in the current iteration process.

In some embodiments, the performing collaborative iterative training on a teacher model and a student model based on an unlabeled sample mixed signal, to obtain the encoder network and the abstractor network includes:

obtaining, in any iteration process, the teacher model in the current iteration process based on the student model in the current iteration process and the teacher model in a previous iteration process;

respectively inputting the unlabeled sample mixed signal into the teacher model and the student model in the current iteration process, and respectively outputting a teacher generalized feature and a student generalized feature of a target component in the sample mixed signal;

obtaining a loss function value of the current iteration process based on at least one of the sample mixed signal, the teacher generalized feature, or the student generalized feature;

adjusting, when the loss function value does not meet a training end condition, a parameter of the student model to obtain the student model in a next iteration process, and performing the next iteration process based on the student model in the next iteration process; and obtaining the encoder network and the abstractor network based on the student model or the teacher model in the current iteration process when the loss function value meets the training end condition.

In some embodiments, the obtaining a loss function value of the current iteration process based on at least one of the sample mixed signal, the teacher generalized feature, or the student generalized feature includes:

obtaining a mean squared error (MSE) between the teacher generalized feature and the student generalized feature;

obtaining a mutual information (MI) value between the sample mixed signal and the student generalized feature; and determining at least one of the MSE or the MI value as the loss function value of the current iteration process.

In some embodiments, the training end condition is that the MSE does not decrease in a first target quantity of consecutive iteration processes; or the training end condition is that the MSE is less than or equal to a first target threshold and the MI value is greater than or equal to a second target threshold; or the training end condition is that a quantity of iterations reaches a second target quantity.

In some embodiments, the obtaining the teacher model in the current iteration process based on the student model in the current iteration process and the teacher model in a previous iteration process includes:

multiplying a parameter set of the teacher model in the previous iteration process by a first smoothing coefficient, to obtain a first parameter set;

multiplying the student model in the current iteration process by a second smoothing coefficient, to obtain a second parameter set, a value obtained by adding the first smoothing coefficient and the second smoothing coefficient being 1;

determining a sum of the first parameter set and the second parameter set as a parameter set of the teacher model in the current iteration process; and performing parameter update on the teacher model in the previous iteration process based on the parameter set of the teacher model in the current iteration process, to obtain the teacher model in the current iteration process.

In some embodiments, the obtaining the encoder network and the abstractor network based on the student model or the teacher model in the current iteration process includes:

respectively determining the first encoder network and the first abstractor network in the student model in the current iteration process as the encoder network and the abstractor network; or respectively determining the second encoder network and the second abstractor network in the teacher model in the current iteration process as the encoder network and the abstractor network.

In some embodiments, the performing audio signal processing based on the generalized feature of the target component includes:

performing text-to-speech conversion on the audio signal of the target object based on the generalized feature of the target component, and outputting text information corresponding to the audio signal of the target object; or performing voiceprint recognition on the audio signal of the target object based on the generalized feature of the target component, and outputting a voiceprint recognition result corresponding to the audio signal of the target object; or generating a response speech corresponding to the audio signal of the target object based on the generalized feature of the target component, and outputting the response speech.

According to an aspect, an electronic device is provided, including one or more processors and one or more memories, the one or more memories storing at least one program code, the at least one program code being loaded and executed by the one or more processors and causing the electronic device to implement the operations performed in the audio signal processing method according to any one of the foregoing possible implementations.

According to an aspect, a non-transitory computer-readable storage medium is provided, storing at least one program code, the at least one program code being loaded and executed by a processor of an electronic device and causing the electronic device to implement the operations performed in the audio signal processing method according to any one of the foregoing possible implementations.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
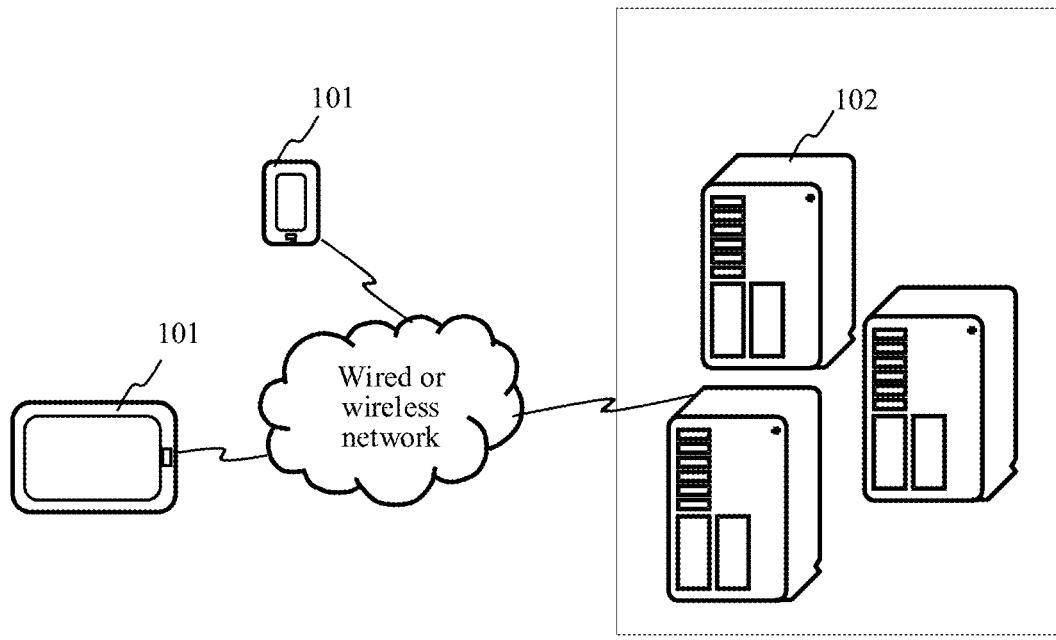
FIG. 1 is a schematic diagram of an implementation environment of an audio signal processing method according to an embodiment of this application.

To make objectives, technical solutions, and advantages of this application clearer, the following further describes implementations of this application in detail with reference to the accompanying drawings.

The terms "first", "second", and the like in this application are used for distinguishing between same items or similar items of which effects and functions are basically the same. The "first", "second", and "nth" do not have a dependency relationship in logic or time sequence, and a quantity and an execution order thereof are not limited.

The term "at least one" in this application means one or more and "a plurality of" means two or more. For example, a plurality of first positions means two or more first positions.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. AI software technologies mainly include several major directions such as a speech processing technology, a computer vision technology, a natural language processing technology, and machine learning (ML)/deep learning.

To make a computer capable of listening, seeing, speaking, and feeling is the future development direction of human-computer interaction, where the speech processing technologies (or referred to as speech technologies) have become one of the most promising human-computer interaction methods in the future. The speech processing technologies specifically include a speech separation technology, an automatic speech recognition (ASR) technology, a Text To Speech (TTS) technology, a voiceprint recognition technology, and the like.

With the development of the AI technology, the speech processing technology is studied and applied to a plurality of fields, such as a common smart speaker, a smart speech assistant, speech front-end processing on a car or TV box, ASR, a speech recognition product, and a voiceprint recognition product. It is believed that with the development of the AI technology, the speech processing technology is to be applied to more fields and play an increasingly important role.

The embodiments of this application relate to the speech separation technology in the field of speech processing technologies. The speech separation technology is briefly described as follows:

The objective of speech separation is to separate a voice of a target speaker from background interference. In audio signal processing, speech separation is one of the most basic types of tasks, and has a wide range of applications, including hearing prostheses, mobile communication, robust ASR, speaker recognition, and the like. A human auditory system can easily separate a voice of one person from a voice of another person. Even in a noisy sound environment like a cocktail party, human ears are capable of focusing on listening to content of a target speaker. Therefore, the speech separation problem is often referred to as the "cocktail party problem".

Since an audio signal acquired by a microphone may include background interference such as noise, a voice of another speaker and reverberation, if downstream tasks such as speech recognition and voiceprint verification are directly performed without conducting speech separation, the accuracy of the downstream tasks is greatly reduced. Therefore, the addition of the speech separation technology to the speech front end can separate the voice of the target speaker from other background interference, thereby improving the robustness of the downstream tasks, and making the speech separation technology gradually become an indispensable part of modern audio processing systems.

In some embodiments, according to different background interference, speech separation tasks are divided into three categories: when the interference is a noise signal, a speech separation task is referred to as speech enhancement; when the interference is another speaker, a speech separation task is referred to as speaker separation; and when the interference is a reflected wave of the voice of the target speaker, a speech separation task is referred to as de-reverberation.

Although a supervised learning-based deep model has achieved certain success in speech separation tasks, according to extensive reports, if interference from noise types that have not been labeled during training occurs in applications, the accuracy of the speech separation system is remarkably reduced.

In addition, researches show that people with only one ear functioning are more likely to be distracted by disturbing sounds. Similarly, single-channel (monaural) speech separation is a very difficult problem in the industry. This is because compared with dual-channel or multi-channel input signals, single-channel input signals lack spatial cues that can be used to locate sound sources.

In view of this, the embodiments of this application provide an audio processing method, which is not only applicable to a dual-channel or multi-channel speech separation scenario, but also applicable to a single-channel speech separation scenario, and can further improve the accuracy of audio processing in various scenarios (especially other than a training scenario).

FIG. 1 is a schematic diagram of an implementation environment of an audio signal processing method according to an embodiment of this application. Referring to FIG. 1, the implementation environment includes a terminal 101 and a server 102. Both the terminal 101 and the server 102 are electronic devices.

In some embodiments, the terminal 101 is configured to acquire audio signals, and the terminal 101 is provided with audio signal acquisition components, such as a microphone and other recording elements. Alternatively, the terminal 101 directly downloads an audio file and decodes the audio file to obtain an audio signal.

In some embodiments, an audio signal processing component is installed on the terminal 101, so that the terminal 101 independently implements the audio signal processing method provided in the embodiments. For example, the processing component is a digital signal processor (DSP). Program codes of an encoder network and an abstractor network provided in the embodiments of this application are run on the DSP, to extract a generalized feature of a target component in a mixed audio signal acquired by the acquisition component, and perform subsequent audio processing tasks based on the generalized feature of the target component. The subsequent audio processing tasks include, but are not limited to, at least one of speech recognition, voiceprint verification, text-to-speech conversion, smart speech assistant response, or smart speaker response. The types of the audio processing tasks are not specifically limited in the embodiments of this application.

In some embodiments, after acquiring the mixed audio signal through the acquisition component, the terminal 101 further sends the mixed audio signal to the server 102, and the server performs audio processing on the mixed audio signal. For example, the program codes of the encoder network and the abstractor network provided in the embodiments of this application are run on the server, to extract the generalized feature of the target component in the mixed audio signal, and perform the subsequent audio processing tasks based on the generalized feature of the target component. The subsequent audio processing tasks include, but are not limited to, at least one of speech recognition, voiceprint verification, text-to-speech conversion, smart speech assistant response, or smart speaker response. The types of the audio processing tasks are not specifically limited in the embodiments of this application.

In some embodiments, the terminal 101 and the server 102 are connected by using a wired network or a wireless network.

The server 102 is configured to process audio signals. The server 102 includes at least one of one server, a plurality of servers, a cloud computing platform, or a virtualization center. Optionally, the server 102 is responsible for primary computing work, and the terminal 101 is responsible for secondary computing work; or, the server 102 is responsible for secondary computing work, and the terminal 101 is responsible for primary computing work; or, the terminal 101 and the server 102 perform collaborative computing by using a distributed computing architecture between each other.

Optionally, the terminal 101 is generally one of a plurality of terminals. The device type of the terminal 101 includes, but is not limited to, at least one of an in-vehicle terminal, a television, a smartphone, a smart speaker, a tablet computer, an ebook reader, a Moving Picture Experts Group Audio Layer III (MP3) player, a Moving Picture Experts Group Audio Layer IV (MP4) player, a portable laptop computer, or a desktop computer. The following embodiment is described by using an example in which the terminal includes a smartphone.

A person skilled in the art learns that, there may be more or fewer terminals 101. For example, there may be only one terminal 101, or there may be dozens of or hundreds of terminals 101 or more. The quantity and the device type of the terminals 101 are not limited in the embodiments of this application.

In an exemplary scenario, the terminal 101 being an in-vehicle terminal is taken as an example. It is assumed that the target component corresponds to an audio signal of a terminal user in the mixed audio signal. The in-vehicle terminal acquires the mixed audio signal, and after the generalized feature of the target component in the mixed audio signal is extracted based on the audio processing method provided in the embodiments of this application, a speech of the user can be separated from the mixed audio signal, and a clean audio signal of the user is abstracted. Not only noise interference, but also voice interference of other speakers are removed in the clean audio signal. Based on the clean audio signal, a speech instruction of the user can be accurately analyzed and responded to, thereby improving the accuracy of audio processing of the in-vehicle terminal, improving the intelligence of an intelligent driving system, and optimizing the user experience. In the future era of 5th generation (5G) wireless systems, with the comprehensive popularization of the Internet of Vehicles, the audio processing method is of important application value.

In an exemplary scenario, the terminal 101 being a smart speaker is taken as an example. It is assumed that the target component corresponds to an audio signal of a terminal user in the mixed audio signal. There is generally background music interference in a playback environment of the smart speaker. The smart speaker acquires the mixed audio signal carrying the interference, and after the generalized feature of the target component in the mixed audio signal is extracted based on the audio processing method provided in the embodiments of this application, a speech of the user can be separated from the mixed audio signal, and a clean audio signal of the user is abstracted. Not only the background music interference, but also voice interference of other speakers are removed in the clean audio signal. Based on the clean audio signal, a speech instruction of the user can be accurately analyzed and responded to, thereby improving the accuracy of audio processing of the smart speaker, and optimizing the user experience.

In an exemplary scenario, the terminal 101 being a smartphone is taken as an example. It is assumed that the target component corresponds to an audio signal of a terminal user in the mixed audio signal. The environment in which the user uses the smartphone is generally unpredictable, complex, and changeable, and the types of interference in the environment are also diverse. For the conventional supervised learning-based deep model, it is apparently impractical to collect labeled training data covering various scenarios. However, in this embodiment of this application, the smartphone acquires the mixed audio signal carrying the interference, and extracts the generalized feature of the target component in the mixed audio signal based on the audio processing method provided in the embodiments of this application. Regardless of the scenarios, a speech of the user can be separated from the mixed audio signal, and a clean audio signal of the user is abstracted. Not only the background music interference, but also voice interference of other speakers are removed in the clean audio signal. Based on the clean audio signal, a speech instruction of the user can be accurately analyzed and responded to. For example, after triggering a text-to-speech conversion instruction, the user records a speech with noise interference. After abstracting the clean audio signal of the user, the smartphone can accurately convert the speech of the user into corresponding text, thereby greatly improving the accuracy and precision of the text-to-speech conversion process, improving the accuracy of audio processing of the smartphone, and optimizing the user experience.

The foregoing scenarios are all exemplary scenarios of the audio processing method involved in the embodiments of this application, and are not to constitute a limitation on the application scenarios of the audio processing method. The audio processing method is applicable to front ends of various downstream tasks of audio processing, and has high availability, portability, and portability as a pre-processing step for speech separation and feature extraction of the mixed audio signal. In addition, the method has good performance for the difficult cocktail party problem and the single-channel speech separation problem. The details are given below.

Figure 2:
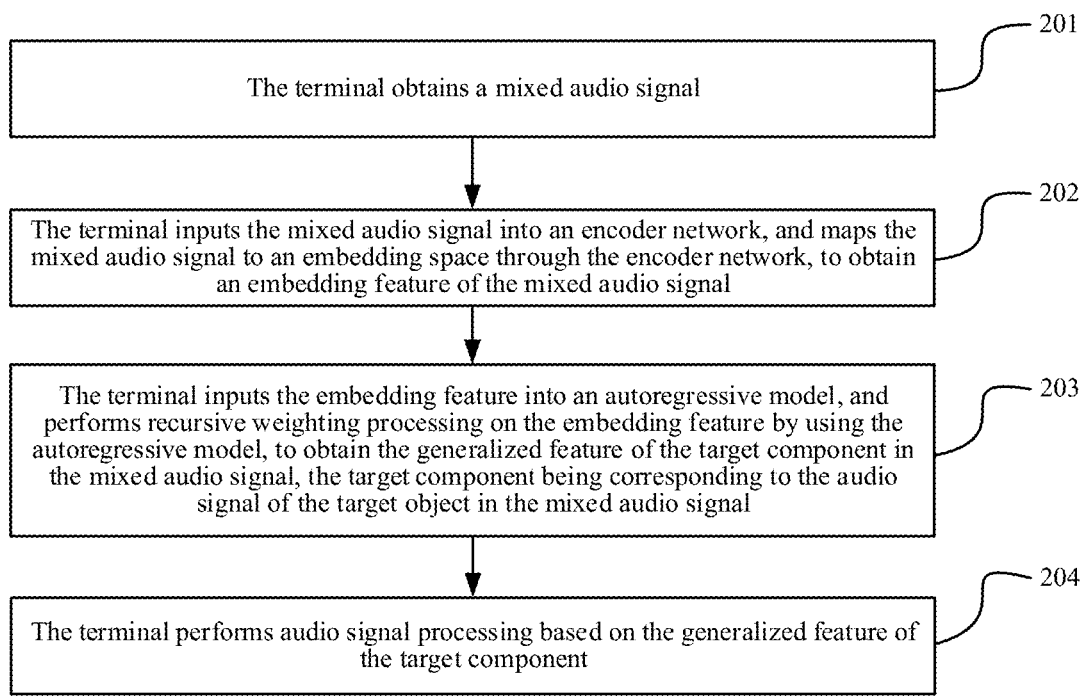
FIG. 2 is a flowchart of an audio signal processing method according to an embodiment of this application.

FIG. 2 is a flowchart of an audio signal processing method according to an embodiment of this application. Referring to FIG. 2, this embodiment is applied to the terminal 101 in the foregoing embodiment, or applied to the server 102, or applied to the interaction process between the terminal 101 and the server 102. In this embodiment, an example is taken in which this embodiment is applied to the terminal 101. This embodiment includes the following steps:

201: The terminal obtains a mixed audio signal.

The mixed audio signal includes an audio signal of a target object. The target object is any object capable of making a sound, such as at least one of a natural person, a virtual image, a smart customer service assistant, a smart speech assistant, or an AI robot. For example, a speaker with the highest energy in the mixed audio signal is determined as the target object, and the type of the target object is not specifically limited in this embodiment of this application. In addition to the audio signal of the target object, the mixed audio signal further includes at least one of a noise signal or an audio signal of another object. The other object refers to any object other than the target object. The noise signal includes at least one of white noise, pink noise, brown noise, blue noise, or purple noise. The type of the noise signal is not specifically limited in this embodiment of this application.

In some embodiments, in the foregoing process, an application is installed on the terminal. After the user triggers an audio acquisition instruction in the application, an operating system responds to the audio acquisition instruction, and calls a recording interface to drive an audio signal acquisition component (for example, a microphone) to acquire the mixed audio signal in the form of an audio stream. In some other embodiments, the terminal alternatively selects an audio from locally pre-stored audios as the mixed audio signal. In some other embodiments, the terminal further downloads an audio file from the cloud, and parses the audio file to obtain a mixed audio signal. The manner of obtaining the mixed audio signal is not specifically limited in this embodiment of this application.

202: The terminal inputs the mixed audio signal into an encoder network, and maps the mixed audio signal to an embedding space through the encoder network, to obtain an embedding feature of the mixed audio signal.

In the foregoing process, the encoder network non-linearly maps the input signal (the mixed audio signal) from the low-dimensional space to the high-dimensional embedding space, that is, a vector representation of the input signal in the embedding space is the foregoing embedding feature.

In the foregoing step 202, the terminal inputs the mixed audio signal into the encoder network, and performs embedding processing on the mixed audio signal through the encoder network, to obtain the embedding feature of the mixed audio signal, which is equivalent to encoding the mixed audio signal once to obtain the high-dimensional embedding feature with stronger expression capability, so that the subsequent extraction of a generalized feature of a target component has higher accuracy.

Step 202 is a process of performing embedding processing on the mixed audio signal to obtain the embedding feature of the mixed audio signal. In this process, an example is taken for description in which the terminal implements the embedding processing through the encoder network. In some other embodiments, in step 202, the terminal directly maps the mixed audio signal to the embedding space to obtain the embedding feature of the mixed audio signal.

In some embodiments, the embedding processing is implemented by mapping, that is, in step 202, the terminal maps the mixed audio signal to the embedding space to obtain the embedding feature.

203: The terminal inputs the embedding feature into an autoregressive model, and performs recursive weighting processing on the embedding feature by using the autoregressive model, to obtain the generalized feature of the target component in the mixed audio signal, the target component being corresponding to the audio signal of the target object in the mixed audio signal.

Since the mixed audio signal is generally in the form of an audio data stream, that is, the mixed audio signal includes at least one audio frame, correspondingly, the embedding feature of the mixed audio signal includes an embedding feature of at least one audio frame.

In some embodiments, the foregoing autoregressive model is a long short-term memory (LSTM) network. The LSTM network includes an input layer, a hidden layer, and an output layer. The hidden layer includes a plurality of memory units with a hierarchical structure. Each memory unit corresponds to an embedding feature of an audio frame of the mixed audio signal in the input layer.

For any memory unit in any layer of the LSTM network, when the memory unit receives the embedding feature of the audio frame and an output feature of a previous memory unit in this layer, weighted transformation is performed on the embedding feature of the audio frame and the output feature of the previous memory unit, to obtain an output feature of the memory unit. The output feature of the memory unit is respectively outputted to a next memory unit in this layer and a memory unit at a corresponding position in a next layer. Each memory unit in each layer performs the foregoing operations, which is equivalent to performing recursive weighting processing in the entire LSTM network.

Based on the above, the terminal inputs embedding features of a plurality of audio frames in the mixed audio signal into a plurality of memory units in a first layer, the plurality of memory units in the first layer perform one-way recursive weighted transformation on the embedding features of the plurality of audio frames, to obtain intermediate features of the plurality of audio frames, and the intermediate features of the plurality of audio frames are respectively inputted into a plurality of memory units of a second layer, and so on, until a plurality of memory units of a last layer output the generalized feature of the target component in the plurality of audio frames.

In some embodiments, the foregoing autoregressive model is also a bidirectional long short-term memory (BLSTM) network. The BLSTM network includes a forward LSTM and a backward LSTM. The BLSTM network also includes an input layer, a hidden layer, and an output layer. The hidden layer includes a plurality of memory units in a hierarchical structure. Each memory unit corresponds to an embedding feature of an audio frame of the mixed audio signal in the input layer. However, different from the LSTM network, each memory unit in the BLSTM network not only performs a weighting operation corresponding to the forward LSTM, but also performs a weighting operation corresponding to the backward LSTM.

For any memory unit in any layer of the BLSTM network, in one aspect, when the memory unit receives the embedding feature of the audio frame and an output feature of a previous memory unit in this layer, weighted transformation is performed on the embedding feature of the audio frame and the output feature of the previous memory unit, to obtain an output feature of the memory unit. The output feature of the memory unit is respectively outputted to a next memory unit in this layer and a memory unit at a corresponding position in a next layer. In another aspect, when the memory unit receives the embedding feature of the audio frame and an output feature of a next memory unit in this layer, weighted transformation is performed on the embedding feature of the audio frame and the output feature of the next memory unit, to obtain an output feature of the memory unit. The output feature of the memory unit is respectively outputted to a previous memory unit in this layer and a memory unit at a corresponding position in a next layer. Each memory unit in each layer performs the foregoing operations, which is equivalent to performing recursive weighting processing in the entire BLSTM network.

Based on the above, the terminal inputs embedding features of a plurality of audio frames in the mixed audio signal into a plurality of memory units in a first layer, the plurality of memory units in the first layer perform two-way (including forward and backward) recursive weighted transformation on the embedding features of the plurality of audio frames, to obtain intermediate features of the plurality of audio frames, and the intermediate features of the plurality of audio frames are respectively inputted into a plurality of memory units of a second layer, and so on, until a plurality of memory units of a last layer output the generalized feature of the target component in the plurality of audio frames.

Step 203 is a process of performing recursive weighting processing on the embedding feature, to obtain the generalized feature of the target component. In some embodiments, the process of obtaining the generalized feature is implemented by using an abstractor network, that is, step 203 is a process of inputting the embedding feature into an abstractor network, and performing generalized feature extraction on the embedding feature by using the abstractor network, to obtain the generalized feature of the target component in the mixed audio signal. In the foregoing step 203, the abstractor network being an autoregressive model is taken as an example to describe that the terminal inputs the embedding feature into the abstractor network, and generalized feature extraction is performed on the embedding feature by using the abstractor network, to obtain the generalized feature of the target component in the mixed audio signal. Such generalized features are equivalent to an abstract feature of a speech of the target object, rather than specific features trained for a type of interference or a type of downstream task. The generalized features have good expression capability in normal scenarios, so that the accuracy of audio signal processing performed based on the generalized features is generally improved.

In some embodiments, the abstractor network is alternatively at least one of a recurrent model, summary function, a convolutional neural network (CNN), a time delay neural network (TDNN), or a gated CNN, or a combination of a plurality of different types of networks, and the structure of the abstractor network is not specifically limited in this embodiment of this application.

204: The terminal performs audio signal processing based on the generalized feature of the target component.

The audio signal processing has different meanings in different task scenarios. A few exemplary descriptions are given below:

In a text-to-speech conversion scenario, the terminal performs text-to-speech conversion on the audio signal of the target object based on the generalized feature of the target component, and outputs text information corresponding to the audio signal of the target object. Optionally, when performing text-to-speech conversion, the terminal inputs the generalized feature of the target component into a speech recognition model, and the audio signal of the target object in the mixed audio signal is translated into the corresponding text information by using the speech recognition model. The generalized feature can be better suitable for the text-to-speech conversion scenario, and has relatively high accuracy of audio signal processing.

In a voiceprint payment scenario, the terminal performs voiceprint recognition on the audio signal of the target object based on the generalized feature of the target component, and outputs a voiceprint recognition result corresponding to the audio signal of the target object, to further make a voiceprint payment based on the voiceprint recognition result. Optionally, when performing voiceprint recognition, the terminal inputs the generalized feature of the target component into a voiceprint recognition model, and verifies whether the audio signal of the target object in the mixed audio signal is the own voice by using the voiceprint recognition model, and determines the corresponding voiceprint recognition result. If it is verified that the voiceprint recognition result is "my voice", the subsequent payment operation is performed, or otherwise a payment failure message is returned. The generalized feature can be better suitable for the voiceprint payment scenario, and has relatively high accuracy of audio signal processing.

In a smart speech interaction scenario, the terminal generates a response speech corresponding to the audio signal of the target object based on the generalized feature of the target component, and outputs the response speech. Optionally, when performing speech synthesis, the terminal inputs the generalized feature of the target component into a question answering model. After the question answering model extracts semantic information of the audio signal of the target object in the mixed audio signal, the corresponding response speech is generated based on the semantic information, and the response speech is outputted to the user. The generalized feature can be better suitable for the smart speech interaction scenario, and has relatively high accuracy of audio signal processing.

The above are only a few exemplary audio processing scenarios, and the generalized feature of the target component is better suitable for various audio processing scenarios. According to different audio processing scenarios, downstream audio processing tasks are different, and the manners of audio signal processing are also different. The manner of audio signal processing is not specifically limited in this embodiment of this application.

All of the above technical solutions are combined randomly to form embodiments of this application. Details are not described herein again.

According to the method provided in the embodiments of this application, embedding processing is performed on the mixed audio signal, to obtain the embedding feature of the mixed audio signal; generalized feature extraction is performed on the embedding feature, so that the generalized feature of the target component in the mixed audio signal can be obtained through extraction, the target component being corresponding to the audio signal of the target object in the mixed audio signal; and audio signal processing is performed based on the generalized feature of the target component. The generalized feature of the target component is not aimed at a sound feature of a specific scenario, thereby having good generalization capability and expression capability. Therefore, when audio signal processing is performed based on the generalized feature of the target component, the generalized feature can be better suitable for different scenarios, thereby improving the robustness and generalization of an audio signal processing process, and improving the accuracy of audio signal processing.

In the foregoing embodiment, how to extract the generalized feature of the target component in the mixed audio signal and perform audio processing based on the generalized feature of the target component are described. That is, in the foregoing embodiment, the terminal can extract a robust and universal feature (the generalized feature of the target component) for the audio signal (generally the voice of the target speaker) of the target object from the mixed audio signal mixed with various interference. In this embodiment of this application, how to obtain the encoder network and the abstractor network used in the foregoing audio signal processing method is described, and a training method for an encoder network and an abstractor network based on unsupervised learning is provided.

The foregoing training method is applied to the terminal 101 or the server 102 in the foregoing implementation environment. In this embodiment, the method being applied to the server 102 is taken as an example for description. Optionally, after obtaining the encoder network and the abstractor network through training, the server 102 sends the trained encoder network and abstractor network to the terminal 101, so that the terminal 101 performs the audio signal processing method in the foregoing embodiment.

In the training process, the server first obtains an unlabeled sample mixed signal, and performs collaborative iterative training on a teacher model and a student model based on the unlabeled sample mixed signal, to obtain the encoder network and the abstractor network used in the foregoing embodiment.

The unlabeled sample mixed signal is training data that is not labeled. The sample mixed signal also includes an audio signal of a target object. The target object is any object capable of making a sound, such as at least one of a natural person, a virtual image, a smart customer service assistant, a smart speech assistant, or an AI robot. For example, a speaker with the highest energy in the mixed audio signal is determined as the target object, and the type of the target object is not specifically limited in this embodiment of this application. In addition to the audio signal of the target object, the sample mixed signal further includes at least one of a noise signal or an audio signal of another object. The noise signal includes at least one of white noise, pink noise, brown noise, blue noise, or purple noise. The type of the noise signal is not specifically limited in this embodiment of this application.

The process for the server to obtain the sample mixed signal is similar to the process for the terminal to obtain the mixed audio signal in step 201, and the details are not described herein. The server further automatically generates an unlabeled sample mixed signal based on a speech generation model, and completes the subsequent training process based on the generated sample mixed signal.

It is assumed that $\chi$ is used to represent a training set. $\chi$ includes a set of labeled training samples $\{X^{(1)}, \ldots, X^{(L)} \in \chi\}$, a set of unlabeled training samples $\{X^{(L+1)}, \ldots, X^{(L+U)} \in \chi\}$, and a set of background interference and noise samples $\{X^{(L+U+1)}, \ldots, X^{(L+U+N)} \in \chi\}$. Each training sample (or noise sample) is formed by a set of time-frequency points $\{x=X_{t,f}\}_{t=1\ldots,T, f=1\ldots,F}$ in an input space. X represents a training sample, t represents a frame index, f represents a frequency band index, T represents a quantity of audio frames included in the training sample, and F represents a quantity of frequency bands included in the training sample.

In the training method based on unsupervised learning provided in this embodiment of this application, there is a lack of labeled training samples in the training set, that is, L=0, U≥1, and N≥0.

Figure 3:
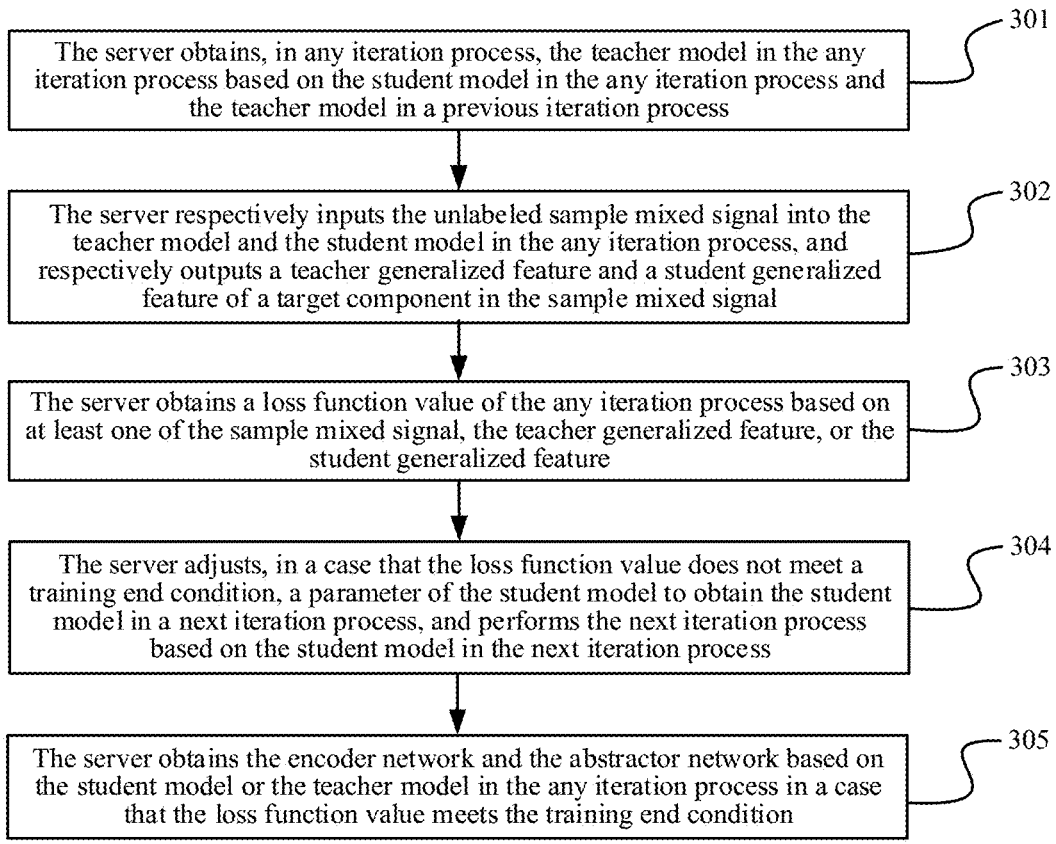
FIG. 3 is a flowchart of a training method for an encoder network and an abstractor network according to an embodiment of this application.

FIG. 3 is a flowchart of a training method for an encoder network and an abstractor network according to an embodiment of this application. Referring to FIG. 3, in this embodiment of this application, any iteration process is taken as an example to illustrate how collaborative iterative training is performed on the teacher model and the student model. This embodiment includes the following steps:

301: The server obtains, in any iteration process, the teacher model in the current iteration process based on the student model in the current iteration process and the teacher model in a previous iteration process.

The student model includes a first encoder network and a first abstractor network, the teacher model includes a second encoder network and a second abstractor network, an output of the first encoder network is used as an input of the first abstractor network, and an output of the second encoder network is used as an input of the second abstractor network.

Optionally, The teacher model in each iteration process is obtained by weighting the teacher model in a previous iteration process and the student model in the current iteration process. In the foregoing step 301, the server obtains the teacher model in the current iteration process by performing the following sub-steps:

3011: The server multiplies a parameter set of the teacher model in the previous iteration process by a first smoothing coefficient, to obtain a first parameter set.

In the foregoing process, the server multiplies a parameter set of the second encoder network and a parameter set of the second abstractor network in the teacher model in the previous iteration process by the first smoothing coefficient respectively, to obtain a first parameter set corresponding to the second encoder network and a first parameter set corresponding to the second abstractor network respectively.

In an example, it is assumed that the parameter set of the second encoder network is represented by $\theta'$, the parameter set of the second abstractor network is represented by $\psi'$, the first smoothing coefficient is represented by $\alpha$, the current iteration process is an $l^{th}$ ($l \geq 2$) iteration process, and the previous iteration process is an $(l-1)^{th}$ iteration process. In this case, the server multiplies a parameter set $\theta_{l-1}'$ of the second encoder network and a parameter set $\psi_{l-1}'$ of the second abstractor network in the teacher model used in the $(l-1)^{th}$ iteration process by the first smoothing coefficient $\alpha$ respectively, to obtain a first parameter set $\alpha\theta_{l-1}'$ corresponding to the second encoder network and a first parameter set corresponding to the second abstractor network.

3012: The server multiplies the student model in the current iteration process by a second smoothing coefficient, to obtain a second parameter set, a value obtained by adding the first smoothing coefficient and the second smoothing coefficient being 1.

The student model in the current iteration process is obtained through parameter adjustment based on the student model in the previous iteration process.

In the foregoing process, the server multiplies a parameter set of the first encoder network and a parameter set of the first abstractor network in the student model in the current iteration process by the second smoothing coefficient respectively, to obtain a second parameter set corresponding to the first encoder network and a second parameter set corresponding to the first abstractor network respectively.

Based on the foregoing example, it is assumed that the parameter set of the first encoder network is represented by $\theta$, and the parameter set of the first abstractor network is represented by $\psi$. Since the value obtained by adding the first smoothing coefficient and the second smoothing coefficient is 1, the second smoothing coefficient is represented by $1-\alpha$. The server multiplies a parameter set $\theta_l$ of the first encoder network and a parameter set $\psi_l$ of the first abstractor network in the student model used in the (l)$^{th}$ iteration process by the second smoothing coefficient 1−α respectively, to obtain a second parameter set (1−α)θ$_l$ corresponding to the first encoder network and a second parameter set (1−α)ψ$_l$ corresponding to the first abstractor network.

3013: The server determines a sum of the first parameter set and the second parameter set as a parameter set of the teacher model in the current iteration process.

In the foregoing process, the server determines a sum of the first parameter set of the second encoder network of the teacher model in the previous iteration process and the second parameter set of the first encoder network of the student model in the current iteration process as a parameter set of the second encoder network of the teacher model in the current iteration process, and similarly, determines a sum of the first parameter set of the second abstractor network of the teacher model in the previous iteration process and the second parameter set of the first abstractor network of the student model in the current iteration process as a parameter set of the second abstractor network of the teacher model in the current iteration process.

Based on the foregoing example, the server determines a sum of the first parameter set αθ$_{l-1}'$ of the second encoder network in the (l−1)$^{th}$ iteration process and the second parameter set (1−α)θ$_l$ of the first encoder network in the l$^{th}$ iteration process as a parameter set θ$_l'$ of the second encoder network in the teacher model in the l$^{th}$ iteration process. That is, the parameter set θ$^h$ of the second encoder network in the teacher model in the l$^{th}$ iteration process is represented by the following formula:

θ$_l'$=αθ$_{l-1}'$+(1−α)θ$_l$

Based on the foregoing example, the server determines a sum of the first parameter set αψ$_{l-1}'$ of the second abstractor network in the (l−1)$^{th}$ iteration process and the second parameter set (1−α)ψ$_l$ of the first abstractor network in the l$^{th}$ iteration process as a parameter set of the second abstractor network in the teacher model in the l$^{th}$ iteration process. That is, the parameter set ψ$_l'$ of the second abstractor network in the teacher model in the l$^{th}$ iteration process is represented by the following formula:

ψ$_l'$=αψ$_{l-1}'$+(1−α)ψ$_l$

3014: The server performs parameter update on the teacher model in the previous iteration process based on the parameter set of the teacher model in the current iteration process, to obtain the teacher model in the current iteration process.

In the foregoing process, after obtaining the parameter set θ$_l'$ of the second encoder network and the parameter set ψ$_l'$ of the second abstractor network in the teacher model in the l$^{th}$ iteration process, the server updates the parameter set θ$_{l-1}'$ of the second encoder network in the teacher model in the (l−1)$^{th}$ iteration process to the foregoing θ$_l'$, and updates the parameter set ψ$_{l-1}'$ of the second abstractor network in the teacher model in the (l−1)$^{th}$ iteration process to the foregoing ψ$_l'$, thereby obtaining the teacher model in the l$^{th}$ iteration process.

In the foregoing steps 3011 to 3014, the server may respectively update the parameter sets of the second encoder network and the second abstractor network in the teacher model based on an exponential moving average (EMA) method. For example, in the first iteration process, the teacher model and the student model are initialized (or pre-trained) separately, and parameters of the teacher model and the student model are kept the same in the first iteration process. Next, the teacher model in the second iteration process is equivalent to a weighted average of the teacher model (with the same parameters as the student model) in the first iteration process and the parameter set of the student model in the second iteration process. With the iterations of the student model and the teacher model, it can be learned that the final teacher model is essentially equivalent to a weighted average of the student model in a plurality of historical iteration processes. The teacher model obtained based on the EMA method can better reflect the performance of the student model in the plurality of historical iteration processes, and is conducive to collaborative training of a student model with better robustness.

302: The server respectively inputs the unlabeled sample mixed signal into the teacher model and the student model in the current iteration process, and respectively outputs a teacher generalized feature and a student generalized feature of a target component in the sample mixed signal.

In the foregoing step 302, for the student model in the current iteration process, the server inputs the unlabeled sample mixed signal into the first encoder network in the student model in the current iteration process; performs embedding processing on the sample mixed signal by using the first encoder network in the current iteration process, to obtain a student embedding feature of the sample mixed signal; inputs the student embedding feature of the sample mixed signal into the first abstractor network in the student model in the current iteration process; and performs generalized feature extraction on the sample mixed signal by using the first abstractor network in the current iteration process, to output a student generalized feature of a target component in the sample mixed signal. The target component corresponds to an audio signal of a target object in the sample mixed signal. The foregoing process is similar to steps 202 and 203 in the foregoing embodiment, and the details are not described herein.

In the foregoing step 302, for the teacher model in the current iteration process, the server inputs the unlabeled sample mixed signal into the second encoder network in the teacher model in the current iteration process; performs embedding processing on the sample mixed signal by using the second encoder network in the current iteration process, to obtain a teacher embedding feature of the sample mixed signal; inputs the teacher embedding feature of the sample mixed signal into the second abstractor network in the teacher model in the current iteration process; and performs generalized feature extraction on the sample mixed signal by using the second abstractor network in the current iteration process, to output a teacher generalized feature of a target component in the sample mixed signal. The target component corresponds to an audio signal of a target object in the sample mixed signal. The foregoing process is similar to steps 202 and 203 in the foregoing embodiment, and the details are not described herein.

In an example, it is assumed that x is used to represent the sample mixed signal, and $E_\theta$ is used to represent the first encoder network of the student model in the current iteration process, where θ represents the parameter set of the first encoder network. In this case, it is equivalent that the first encoder network $E_\theta$ performs a nonlinear mapping on the sample mixed signal x, to map the sample mixed signal x from an input domain to a high-dimensional embedding space, to output a student embedding feature v of the sample mixed signal. In other words, the function of the first encoder network $E_\theta$ is equivalent to the following mapping relationship:

$E_\theta: x \rightarrow v \subseteq \mathbb{R}^{TF \times D}$

In the foregoing mapping relationship, $x \subseteq \mathbb{R}^{TF}$ represents a short-time Fourier transform (STFT) spectrum of the single-channel sample mixed signal, T represents a quantity of audio frames of the inputted sample mixed signal, F represents a quantity of frequency bands of the STFT spectrum, $\mathbb{R}^{TF}$ represents the input domain of the first encoder network $E_\theta$, D represents a dimension of the embedding space, and $\mathbb{R}^{TF \times D}$ represents an output domain (that is, the embedding space) of the first encoder network $E_\theta$. That is, the first encoder network $E_\theta$ represents a continuously differentiable parameter function, and can map the sample mixed signal x from the input domain $\mathbb{R}^{TF}$ to the embedding space $\mathbb{R}^{TF \times D}$.

In some embodiments, an STFT feature of the sample mixed signal X is at least one of a logarithmic Mel spectrum feature or a Mel frequency cepstrum coefficient (MFCC) feature, or a combination of the logarithmic Mel spectrum feature and the MFCC feature, or further includes a posterior prediction score of an autoregressive model, a Mel spectrum feature, or a feature of another factor. The type of the STFT feature is not specifically limited in this application.

Based on the foregoing example, it is assumed that $A_\psi$ is used to represent the first abstractor network of the student model in the current iteration process, where $\psi$ represents the parameter set of the first abstractor network, then the function of the first abstractor network $A_\psi$ is equivalent to the following mapping relationship:

$$A_\psi : v \to p \subseteq \mathbb{R}^{TF}, v \times p \to c \subseteq \mathbb{R}^D$$

In the foregoing mapping relationship, v represents the student embedding feature of the sample mixed signal, p represents a feature obtained after the first abstractor network $A_\psi$ performs weighting processing on the student embedding feature v, and c represents the student generalized feature of the target component in the sample mixed signal. In this case, the student generalized feature c is a feature obtained after the recursive weighted transformation between an input feature v and an output feature p of the first abstractor network $A_\psi$. In addition, $\mathbb{R}^D$ represents an output domain of the first abstractor network $A_\psi$. The meanings of T, F, D, and $\mathbb{R}^{TF}$ are the same as those in the foregoing example, and the details are not described herein.

In some embodiments, the first abstractor network is an autoregressive model. Therefore, through the autoregressive model, discrete student generalized features can be constructed in time series based on local student embedding features. The student generalized features constructed in this case may be short-term or long-term. The time resolution of the student generalized feature is not specifically limited in this embodiment of this application.

Optionally, in a causal system, the foregoing autoregressive model uses an LSTM network. The causal system is also referred to as a nonanticipative system, that is, a system whose output cannot appear before an input arrives. In other words, an output of the system at a moment only depends on an input of the system at the moment and before the moment, and is not related to an input after the moment. In this case, one-way recursive weighting processing is performed by using the LSTM network, which can avoid ignoring the timing causal relationship between previous and subsequent audio frames.

Optionally, in a noncausal system, the foregoing autoregressive model uses a BLSTM network. The noncausal system means that an output at the current moment not only depends on a current input, but also depends on a future input. Therefore, two-way recursive weighting processing is performed by using the BLSTM network, which can not only can consider the role of each historical audio frame before each audio frame, but also consider the role of each future audio frame after each audio frame, thereby better retaining context information between audio frames.

In the foregoing case, it is assumed that a predicted value p (that is, the output feature of the first abstractor network in the foregoing example) is given, then the student generalized feature c is represented by the following formula:

$$c_t = \frac{\sum_f v_t \odot p_t}{\sum_f p_t}$$

In the foregoing formula, $c_t \in c$ represents a student generalized feature of a $t^{th}$ audio frame, $v_t \in v$ represents a student embedding feature of the $t^{th}$ audio frame, $p_t \in p$ represents a predicted value outputted by the first abstractor network for the $t^{th}$ audio frame, $\odot$ represents a dot product operation between features, t ($t \geq 1$) represents a frame index, and f represents a frequency band index.

In some embodiments, the numerator and the denominator in the foregoing formula are respectively multiplied by a binary threshold matrix w, which can help reduce the interference of low-energy noise in the sample mixed signal (equivalent to a high-pass filter). In this case, the student generalized feature c is represented by the following formula:

$$c_t = \frac{\sum_f v_t \odot p_t \odot w_t}{\sum_f p_t \odot w_t}$$

In the foregoing formula, $w_t \in w$ represents a binary threshold matrix of the $t^{th}$ audio frame, and $w \in \mathbb{R}^{TF}$. The meanings of the other symbols are the same as those in the previous formula, and the details are not described herein.

For a binary threshold matrix $w_{t,f}$ with a frame index of t and a frequency band index of f, the binary threshold matrix $w_{t,f}$ is represented by the following formula:

$$w_{t,f} = \begin{cases} 0, & \text{if } X_{t,f} < \max(X)/100 \\ 1, & \text{otherwise} \end{cases}$$

In the foregoing formula, X represents a training set formed by the sample mixed signal. That is, if an energy value of the sample mixed signal $X_{t,f}$ with the frame index of t and the frequency band index of f in the training set is less than 1% of a largest energy value of the sample mixed signal in the training set, the binary threshold matrix $w_{t,f}$ is set to 0, so that the interference of the sample mixed signal $X_{t,f}$ (low-energy noise) when calculating the student generalized feature; otherwise the binary threshold matrix $w_{t,f}$ is set to 1, and an audio component other than the low-energy noise is calculated as usual.

In the foregoing process, a student generalized feature is constructed for each audio frame. Such a discrete student generalized feature $c_t$ is more suitable for some tasks that require high time domain resolution information, such as spectrum reconstruction for the target speaker.

In some other embodiments, the first abstractor network further uses a summary function or a recurrent model, so that a global student generalized feature can be constructed based on the local student embedding features by using the summary function or the recurrent model. The type of the first abstractor network is not specifically limited in this embodiment of this application.

In the foregoing case, it is assumed that a predicted value p (that is, the output feature of the first abstractor network in the foregoing example) is given, then the student generalized feature c is represented by the following formula:

$$c = \frac{\sum_{t,f} v \odot p \odot w}{\sum_{t,f} p \odot w}$$

c, v, p, w, t, and f have the same meanings as the same symbols in the foregoing formulas, and for the sake of brevity, the dimension index subscripts of c, v, p, and w are omitted. The details are not described herein.

The student generalized feature c in the foregoing formula represents a long-term, stable, global, and "slow" (referring to low time domain resolution) abstract feature, and is more suitable for some tasks that only require low time domain resolution information, such as generalizing a feature of a hidden target speaker.

303: The server obtains a loss function value of the current iteration process based on at least one of the sample mixed signal, the teacher generalized feature, or the student generalized feature.

Since the sample mixed signal used in the training process is not labeled, the audio signal of the target object hidden in the sample mixed signal cannot be directly observed in this case. That is, an implicit input signal is used in the training process, so that the conventional method of calculating a loss function value for an explicit input signal is no longer be applicable. The conventional method of calculating a loss function value for an explicit input signal includes noise contrastive estimation (NCE), deep infomax (DIM), and the like.

In view of this, this embodiment of this application provides a calculation module (estimator) for the student model, and the calculation module is configured to calculate a loss function value of the first encoder network and the first abstractor network in each iteration process.

Optionally, the foregoing loss function value includes at least one of a mean squared error (MSE) between the teacher generalized feature and the student generalized feature, or a mutual information (MI) value between the sample mixed signal and the student generalized feature.

In the foregoing step 303, the server obtains the loss function value of the current iteration process by performing the following sub-steps:

3031: The server obtains an MSE between the teacher generalized feature and the student generalized feature in the current iteration process.

In the foregoing process, the MSE between the teacher generalized feature and the student generalized feature is represented by the following formula:

$$L_{\theta,\psi}^{(MSE)} = \sum_{t,f} \|x \cdot (\text{Sigmoid } (c_t'^T v_{t,f}') - \text{Sigmoid } (c_t^T v_{t,f}))\|_2^2$$

In the foregoing formula, $L_{\theta,\psi}^{(MSE)}$ represents the MSE between the teacher generalized feature and the student generalized feature, t represents the frame index, f represents the frequency band index, x represents the sample mixed signal, sigmoid represents an activation function, $c_t'^T$ represents a transposed vector of the teacher generalized feature $c_t'$, $v_{t,f}'$ represents a teacher embedding feature, $c_t^T$ represents a transposed vector of the student generalized feature $c_t$, and $v_{t,f}$ represents a student embedding feature.

3032: The server obtains an MI value between the sample mixed signal and the student generalized feature in the current iteration process.

In the foregoing process, it is assumed that the student model includes a first encoder network $E_\theta$, a first abstractor network $A_\psi$, and a calculation module $T_\omega$. θ is a parameter set of the first encoder network $E_\theta$, ψ is a parameter set of the first abstractor network $A_\psi$, and ω is a parameter set of the calculation module $T_\omega$. In this case, a parameter set of the entire student model is represented as Θ={θ,ψ,ω}.

In the foregoing step 302, the equivalent mapping relationship between the first encoder network $E_\theta$ and the first abstractor network $A_\psi$ is described, and the details are not described herein. The equivalent mapping relationship of the calculation module $T_\omega$ is described below, and the expression is as follows:

$$T_\omega : v \times c \to \mathbb{R}$$

The foregoing expression of the mapping relationship shows that the calculation module $T_\omega$ uses the student embedding feature v and the student generalized feature c as input, and outputs an MI value in an output domain $\mathbb{R}$.

In view of the foregoing mapping relationship, the calculation module $T_\omega$ is modeled by the following formula:

$$T_\omega = D_\omega \odot g \odot (E_\theta, A_\omega)$$

In the foregoing formula, g represents a function that combines the student embedding feature outputted by $E_\theta$ and the student generalized feature outputted by $A_\psi$, and $D_\omega$ represents a function for calculating the MI value.

In this embodiment of this application, training samples are unlabeled interfered sample mixed signals. A time-frequency point x of such sample mixed signals are considered to be a linear mixture between a time-frequency point x of the audio signal of the target object and a time-frequency point x' of an interfering signal, that is, x=x+x'. A distribution of the sample mixed signal is P≈p(x,c), where p is a predicted value determined by the first abstractor network according to the sample mixed signal x and the student generalized feature c. In addition, the training samples further include interfering signals (pure interference or background noise), that is, x=x'. A proposal distribution of the interfering signals is $\tilde{P}$.

In this case, this embodiment of this application provides a loss function referred to as infomax noise-interference contractive estimation (ImNICE) for the implicit input signal. In this case, the MI value (that is, the ImNICE loss function value) between the sample mixed signal and the student generalized feature is represented by the following formula:

$$L_\Theta^{(ImNICE)} = -E_P\left[\log\frac{f_\Theta(x,c)}{f_\Theta(x,c) + E_{\tilde{P}}\left[\sum_{x'} f_\Theta(x',c)\right]}\right]$$

In the foregoing formula, $L_\Theta^{(ImNICE)}$ represents the ImNICE loss function value between the sample mixed signal and the student generalized feature, $\Theta=\{\theta, \psi, \omega\}$ represents the parameter set of the entire student model, x represents a time-frequency point predicted as a positive sample in the input signal by the student model, x follows the foregoing distribution $P \approx p(x,c)$, x' represents a time-frequency point predicted as a negative sample in the input signal by the student model, and x' follows the foregoing proposal distribution $\tilde{P}$. In other words, x' represents the time-frequency point (corresponding to a noise or interfering signal) of the negative sample selected from the proposal distribution $\tilde{P}$, $E_P$ represents a mathematical expectation of the distribution P, $E_{\tilde{P}}$ represents a mathematical expectation of the proposal distribution $\tilde{P}$, and $c \sim A_\psi$, $(E_\theta(x))$ represents a student generalized feature obtained by the first encoder network $E_\theta$ and the first abstractor network $A_\psi$, after acting on the input signal. In addition, $f_\theta(x',c)=\exp(T_\omega(E_\theta(x',c))$ represents an MI value between the time-frequency point x predicted as the positive sample in the input signal by the student model and the student generalized feature c. Similarly, $f_\theta(x',c)=\exp(T_\omega(E_\theta(x'),c))$ represents an MI value between the time-frequency point x' predicted as the negative sample in the input signal by the student model and the student generalized feature c.

The foregoing definition of the ImNICE loss function value is equivalent to an average cross-entropy loss. Specifically, it is assumed that there is a distribution p and another distribution q, then an average cross-entropy loss between p and q is:

$$H(p,q)=-\Sigma p \log q$$

In this case, based on the relevant knowledge of information theory, the optimal solution of $f_\theta(x, c)$ is inferred as $$\frac{p(x|c)}{p(x)},$$

that is, $$f_\Theta(x, c) \propto \frac{p(x|c)}{p(x)}.$$

$f_\theta(x, c)$ is considered as a probability density ratio, which may be used to estimate the MI value between the inputted sample mixed signal x and the student generalized feature c.

For the conventional explicit input signal, the MI value between the explicit input signal x and the student generalized feature c is calculated according to a definition formula of the MI value. The definition formula is as follows:

$$I(x; c) = \sum_{x,c} p(x, c) \log \frac{p(x|c)}{p(x)}$$

In the foregoing process, I(x; c) represents the MI value between the explicit input signal x and the student generalized feature c, p(x) is a probability distribution of the explicit input signal x, p(x|c) is a conditional probability distribution of the explicit input signal x when having the student generalized feature c, and p(x, c) is a joint distribution between the explicit input signal x and the student generalized feature c. Since the explicit input signal may directly obtain p(x) or p(x|c), the MI value can be calculated directly according to the definition formula.

In this embodiment of this application, since the audio signal of the target object cannot be directly observed in the inputted sample mixed signal, that is, the sample mixed signal is an implicit input signal (this is determined by the nature of unsupervised learning). In this case, when the MI value is calculated, different from the conventional explicit input signal, the MI value cannot be calculated by obtaining p(x) or p(x|c). However, based on the ImNICE loss function value introduced in this embodiment of this application, obtaining p(x) or p(x|c) is avoided, instead, the MI value is calculated by obtaining $f_\theta(x, c)$. Since $f_\theta(x, c)$ is proportional to the probability density ratio between p(x|c) and p(x), $f_\theta(x, c)$ can represent the MI value, thereby resolving the problem that the MI value between the implicit input signal and the student generalized feature cannot be calculated in unsupervised learning.

Since an additional statistical constraint $P \approx p(x,c)$ is introduced in the foregoing ImNICE loss function value, and this statistical constraint p(x, c) is a joint distribution between the sample mixed signal x and the student generalized feature c, p(x, c) is predicted by the teacher model. In each iteration process, the second abstractor network $A_{\psi'}$ of the teacher model performs the following operation:

$$A_{\psi'}:v \rightarrow p, v \times p \rightarrow c$$

The server uses an intermediate predicted value p calculated by the second abstractor network $A_{\psi'}$ as an estimated value of the joint distribution p(x, c).

3033: The server determines at least one of the MSE or the MI value as the loss function value of the current iteration process.

In the foregoing process, the server can ensure consistency-based learning between the teacher model and the student model by obtaining the MSE. If a training end condition is not met, the first encoder network of the student model and the parameter set of the first abstractor network are updated through the following step 304. The MSE is a loss function of a typical reconstruction task. The consistency-based learning is performed based on the MSE, which can ensure the stability and consistency between the student generalized feature learned in the middle and the audio signal of the target object to a specific extent.

In the foregoing process, the server can provide a calculation module for the training process of unsupervised learning by obtaining the MI value. The calculation module is configured to obtain the MI value between the sample mixed signal in the student model and the student generalized feature. Specifically, the probability density ratio $f_\theta(x, c)$ and the statistical constraint p(x, c) are introduced to estimate the MI value of the student model, and the training goal is to minimize the MSE and maximize the MI value.

304: The server adjusts, when the loss function value does not meet a training end condition, a parameter of the student model to obtain the student model in a next iteration process, and performs the next iteration process based on the student model in the next iteration process.

Optionally, the training end condition is that the MSE does not decrease in a first target quantity of consecutive iteration processes; or the training end condition is that the MSE is less than or equal to a first target threshold and the MI value is greater than or equal to a second target threshold; or the training end condition is that a quantity of iterations reaches a second target quantity.

After obtaining the loss function value of the student model in the current iteration process, the server determines whether the loss function value in the current iteration process meets the training end condition. If the training end condition is not met, the student model in the next iteration process is obtained through update based on the foregoing step 304. Further, the foregoing steps 3011 to 3014 are returned to obtain the teacher model in the next iteration process. The operations similar to the foregoing steps 302 and 303 are performed based on the teacher model and the student model in the next iteration process, so that the next iteration training is completed, and so on. The details are not described herein. After a plurality of iterations, until the loss function value of a specific iteration process meets the training end condition, the following step 305 is performed.

305: The server obtains the encoder network and the abstractor network based on the student model or the teacher model in the current iteration process when the loss function value meets the training end condition.

In some embodiments, the server obtains the encoder network and the abstractor network based on the student model in the current iteration process, that is, respectively determines a first encoder network and a first abstractor network in the student model in the current iteration process as the encoder network and the abstractor network.

In some embodiments, the server alternatively obtains the encoder network and the abstractor network based on the teacher model in the current iteration process, that is, respectively determines a second encoder network and a second abstractor network in the teacher model in the current iteration process as the encoder network and the abstractor network.

In the foregoing process, the server performs collaborative iterative training on the teacher model and the student model based on an unlabeled sample mixed signal, to obtain the encoder network and the abstractor network. The teacher model in each iteration process is obtained by weighting the teacher model in a previous iteration process and the student model in the current iteration process. With the collaborative iterative training and consistency-based learning of the teacher model and the student model, it can be ensured that the MSE in the loss function tends to be minimized and the MI value tends to be maximized. If the training end condition is met, it indicates that a pre-set training goal is met. Either the teacher model or the student model in the current iteration process can be selected as the encoder network and the abstractor network. Whether the final encoder network and abstractor network are obtained based on the teacher model or the student model is not specifically limited in this embodiment of this application.

Figure 4:
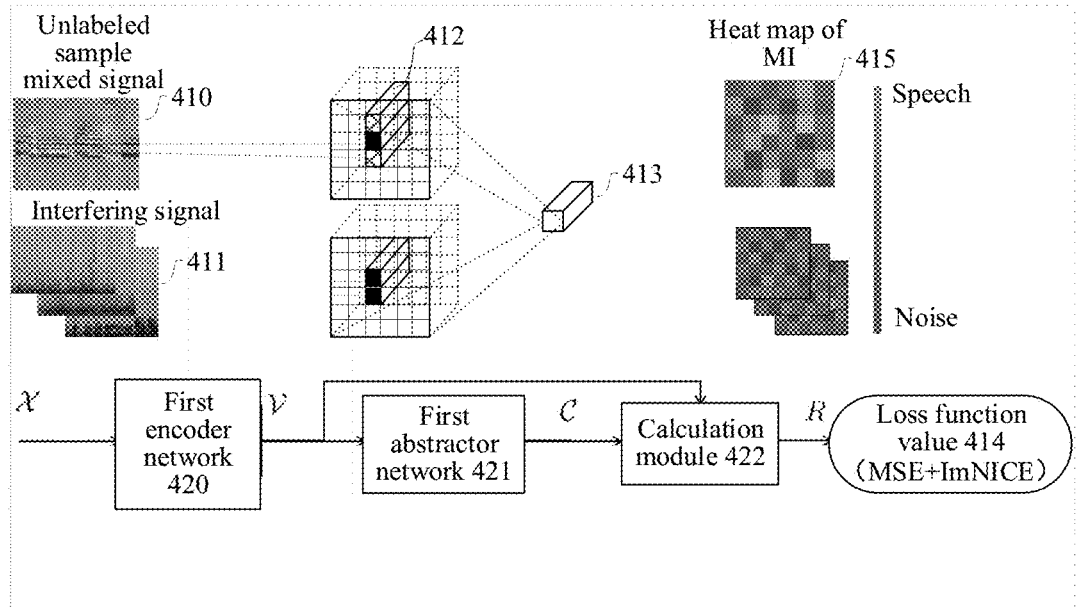
FIG. 4 is a schematic principle diagram of a training method for an encoder network and an abstractor network according to an embodiment of this application.

FIG. 4 is a schematic principle diagram of a training method for an encoder network and an abstractor network according to an embodiment of this application. Referring to FIG. 4, a set of unlabeled sample mixed signals 410 (speech) and a set of interfering signals 411 (noises) are set in a training set. Through a first encoder network 420 of a student model (or a second encoder network of a teacher model), the sample mixed signals 410 and the interfering signals 411 are respectively mapped to a high-dimensional embedding space, to obtain student embedding features 412 (or teacher embedding features) of the sample mixed signals 410 and the interfering signals 411. Through a first abstractor network 421 of the student model (or a second abstractor network of the teacher model), recursive weighting processing is respectively performed on the student embedding features 412 (or the teacher embedding features) of the sample mixed signals 410 and the interfering signals 411, to obtain a student generalized feature 413 (or a teacher generalized feature) of the sample mixed signals and the interfering signals. Based on the student embedding features 412 and the student generalized feature 413 of the sample mixed signals and the interfering signals, a loss function value 414 (unsupervised loss function value) in the current iteration process can be obtained by using a calculation module 422. The loss function value 414 includes at least one of an MSE or an ImNICE loss function value (MI value). In some embodiments, For the MI value obtained by the calculation module, a heat map 415 of the MI value is drawn. In the heat map 415, a time-frequency point in a light-colored area has a greater probability of belonging to the speech of the target speaker, and a time-frequency point in a dark-colored area has a greater probability of belonging to noise or interference. In other words, as the color goes from lighter to darker in the heat map, a probability that a time-frequency point at a corresponding position belongs to noise gradually increases, which is convenient for visually observing a heat distribution of each time-frequency point.

To simply represent the input and output of each network, the input signals (that is, the sample mixed signals 410 and the interfering signals 411) of the first encoder network 420 are represented by $\chi$, and the output signals (that is, the student embedding features 412) of the first encoder network 420 are represented by v. Certainly, the input signals of the first abstractor network 421 are also v. The output signal (that is, the student generalized feature 413) of the first abstractor network 421 is represented by c. The input signals of the calculation module 422 includes v and c. The loss function value 414 outputted by the calculation module 422 is represented by R.

In an exemplary scenario, when an STFT spectrum of the sample mixed signals in the training set is obtained, a sampling rate is set to 16 KHz, an STFT window length is set to 25 ms, an STFT window shift is set to 10 ms, and a quantity of STFT frequency bands is set to 257. When the student model and the teacher model are trained and optimized, a batch data size is set to 32, an initial learning rate is set to 0.0001, and a weight reduction coefficient of the learning rate is set to 0.8. In addition, if the MSE loss of the model is not improved after three consecutive iteration processes, it is considered that the training converges and the training is stopped.

In an exemplary scenario, for the first encoder network of the student model, a quantity of nodes in an output layer of the first encoder network is set to 40, and a quantity of randomly downsampled frames for each training corpus is 32. When the ImNICE loss function value is calculated, a quantity of negative samples corresponding to each positive sample is 63, and a determining threshold of a prediction probability p(x, c) of the positive sample is 0.5.

In an exemplary scenario, the first encoder network is a four-layer BLSTM network, each hidden layer has 600 nodes, and the output layer is a fully connected layer, which can map a 600-dimensional hidden vector (output feature) outputted by the last hidden layer to a 275*40-dimensional high-dimensional embedding space v, to obtain a 275*40-dimensional embedding feature. The 275*40-dimensional embedding feature is inputted into the first abstractor network. The first abstractor network includes a fully connected layer and a two-layer BLSTM network. Through the fully connected layer, the 275*40-dimensional embedding feature (a hidden vector essentially) can be mapped to 600 dimensions, and the 600-dimensional hidden vector is inputted to the two-layer BLSTM network, where each hidden layer has 600 nodes. Finally, the generalized feature is outputted. A simple weighting matrix (for example, a binary threshold matrix) $\omega \in \mathbb{R}^{40 \times 40}$ is used in the calculation module to calculate an inner product between vectors: $T_\omega(v, c) = v^T \omega c$, where $T_\omega(v,c)$ represents the calculation module, v represents the embedding feature, $v^T$ represents a transposed vector of the embedding feature, ω represents the weighting matrix, and c represents the generalized feature.

In the foregoing process, the hyperparameter selection and the model structure are only an exemplary description. In some embodiments, according to the requirements of complexity and performance, a quantity of levels of the BLSTM network in the first encoder network or the first abstractor network is adjusted and changed, or the network structure of the first encoder network or the first abstractor network is adjusted and changed, such as using at least one of an LSTM network, a CNN, a TDNN, or a gated CNN. In addition, according to the limitation of the scenario on the model memory occupation and the requirements of detection accuracy, the network structure of the first encoder network or the first abstractor network is further expanded or simplified.

All of the above technical solutions are combined randomly to form embodiments of this application. Details are not described herein again.

According to the method provided in the embodiments of this application, collaborative iterative training is performed on the teacher model and the student model based on an unlabeled sample mixed signal, to obtain the encoder network and the abstractor network. The teacher model in each iteration process is obtained by weighting the teacher model in a previous iteration process and the student model in the current iteration process. With the collaborative iterative training and consistency-based learning of the teacher model and the student model, a robust and generalizable hidden signal feature (that is, the generalized feature of the target component) can be effectively learned from the unlabeled interfered sample mixed signal, which can be better suitable for a variety of industrial application scenarios, and help to improve the accuracy of audio processing.

Further, when a difference between a training data scenario and a real test scenario is more obvious (that is, the scenarios are more mismatched), a generalized feature extracted by an unsupervised system has more obvious advantages. In addition, there is often a large amount of unlabeled data in an industrial application scenario. Such data are directly used as training samples of the unsupervised system without manual labeling, which avoids the labor costs of labeling the training data, that is, the unsupervised system can mine and utilize more training data.

In most industrial applications that use speech enhancement and speech separation, labeled training data (referring to training samples including clean audio signals of a target object) often can only cover a small part of application scenarios, and a large amount of data is unlabeled. In the conventional supervised system, the unlabeled data needs to be manually labeled, which consumes high labor costs. In an embodiment of this application, a novel unsupervised loss function and a training method based on unsupervised learning are provided, which can develop a large amount of unlabeled training data without manually labeling unlabeled training data, thereby reducing labor costs, and improving the efficiency of obtaining training data.

In addition, supervised learning that only relies on labeled data has the problems of poor robustness and poor generalization. For example, a speech feature learned merely by using supervised learning for a specific type of interfered speech environment often cannot be suitable for another type of interfered background noise environment. In this embodiment of this application, the unsupervised system can extract the generalized feature of the target component. The generalized feature is not extracted for a specific type of interference, but is a feature of high robustness and generalization that is extracted from intricate unlabeled data, which can be suitable for most audio processing scenarios.

Compared with the conventional DANet, ADANet, and ODANet, first of all, the DANet needs embeddings (embedding vectors) of a database to be allocated as input in a training stage. Therefore, there is a problem of a center mismatch of the embeddings between training and testing. Secondly, a permutation invariant training (PIT) method is introduced in the ADANet to alleviate the problem of the center mismatch of the embeddings. The PIT method is to determine a correct output arrangement by calculating a minimum value of a selected target function among all possible input arrangements. However, in the process of full permutation, the PIT method naturally brings high computation complexity, resulting in a large increase in the computing costs when extracting features. Finally, an abstract feature is estimated for each audio frame in the ODANet, and a mask of the audio frame at a future moment is calculated based on the estimated abstract feature, and so on, However, the ODANet is prone to lead to unstable target speaker tracking and mask estimation. To improve the stability of the performance, an expert-defined dynamic weighting function needs to be additionally introduced, and a context window length needs to be carefully adjusted and selected.

In this embodiment of this application, no additional PIT processing is required, so that relatively low computing costs can be ensured. No speaker tracking mechanism is required, and no expert definition processing and adjustment are required, so that the training costs of the encoder network and the abstractor network can be greatly reduced. Moreover, based on the unlabeled training data, the generalized feature of the hidden target component (generally the target speaker) can be automatically learned. Audio processing based on the generalized feature can effectively resolve the cocktail party problem, and has good performance for the difficult single-channel speech separation tasks, which can be suitable for various industrial scenarios, and has relatively high audio processing accuracy.

Figure 5:
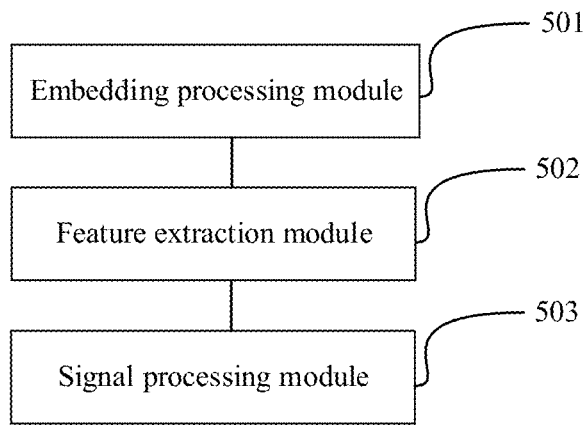
FIG. 5 is a schematic structural diagram of an audio signal processing apparatus according to an embodiment of this application.

FIG. 5 is a schematic structural diagram of an audio signal processing apparatus according to an embodiment of this application. Referring to FIG. 5, the apparatus includes:

- an embedding processing module 501, configured to perform embedding processing on a mixed audio signal, to obtain an embedding feature of the mixed audio signal;
- a feature extraction module 502, configured to perform generalized feature extraction on the embedding feature, to obtain a generalized feature of a target component in the mixed audio signal, the target component being corresponding to an audio signal of a target object in the mixed audio signal; and
- a signal processing module 503, configured to perform audio signal processing based on the generalized feature of the target component.

According to the apparatus provided in the embodiments of this application, embedding processing is performed on the mixed audio signal, to obtain the embedding feature of the mixed audio signal; generalized feature extraction is performed on the embedding feature, so that the generalized feature of the target component in the mixed audio signal can be obtained through extraction, the target component being corresponding to the audio signal of the target object in the mixed audio signal; and audio signal processing is performed based on the generalized feature of the target component. The generalized feature of the target component is not aimed at a sound feature of a specific scenario, thereby having good generalization capability and expression capability. Therefore, when audio signal processing is performed based on the generalized feature of the target component, the generalized feature can be better suitable for different scenarios, thereby improving the robustness and generalization of an audio signal processing process, and improving the accuracy of audio signal processing.

In some embodiments, the embedding processing module 501 is configured to input the mixed audio signal into an encoder network, and perform embedding processing on the mixed audio signal by using the encoder network, to obtain the embedding feature of the mixed audio signal; and the feature extraction module 502 is configured to input the embedding feature into an abstractor network, and perform generalized feature extraction on the embedding feature by using the abstractor network, to obtain the generalized feature of the target component in the mixed audio signal, the target component being corresponding to an audio signal of a target object in the mixed audio signal.

In some embodiments, the embedding processing module 501 is configured to:

map the mixed audio signal to an embedding space, to obtain the embedding feature.

In some embodiments, the feature extraction module 502 is configured to perform recursive weighting processing on the embedding feature, to obtain the generalized feature of the target component.

In some embodiments, the abstractor network is an autoregressive model, and the feature extraction module 502 is configured to:

input the embedding feature into the autoregressive model, and perform recursive weighting processing on the embedding feature by using the autoregressive model, to obtain the generalized feature of the target component.

In some embodiments, based on the apparatus composition of FIG. 5, the apparatus further includes:

a training module, configured to perform collaborative iterative training on a teacher model and a student model based on an unlabeled sample mixed signal, to obtain the encoder network and the abstractor network, where the student model includes a first encoder network and a first abstractor network, the teacher model includes a second encoder network and a second abstractor network, an output of the first encoder network is used as an input of the first abstractor network, an output of the second encoder network is used as an input of the second abstractor network, and the teacher model in each iteration process is obtained by weighting the teacher model in a previous iteration process and the student model in the current iteration process.

In some embodiments, based on the apparatus composition of FIG. 5, the training module includes:

a first obtaining unit, configured to obtain, in any iteration process, the teacher model in the current iteration process based on the student model in the current iteration process and the teacher model in a previous iteration process;

an output unit, configured to respectively input the unlabeled sample mixed signal into the teacher model and the student model in the current iteration process, and respectively output a teacher generalized feature and a student generalized feature of a target component in the sample mixed signal;

a second obtaining unit, configured to obtain a loss function value of the current iteration process based on at least one of the sample mixed signal, the teacher generalized feature, or the student generalized feature;

a parameter adjustment unit, configured to adjust, when the loss function value does not meet a training end condition, a parameter of the student model to obtain the student model in a next iteration process, and perform the next iteration process based on the student model in the next iteration process; and a third obtaining unit, configured to obtain the encoder network and the abstractor network based on the student model or the teacher model in the current iteration process when the loss function value meets the training end condition.

In some embodiments, the second obtaining unit is configured to:

obtain an MSE between the teacher generalized feature and the student generalized feature;

obtain an MI value between the sample mixed signal and the student generalized feature; and determine at least one of the MSE or the MI value as the loss function value of the current iteration process.

In some embodiments, the training end condition is that the MSE does not decrease in a first target quantity of consecutive iteration processes; or the training end condition is that the MSE is less than or equal to a first target threshold and the MI value is greater than or equal to a second target threshold; or the training end condition is that a quantity of iterations reaches a second target quantity.

In some embodiments, the first obtaining unit is configured to:

multiply a parameter set of the teacher model in the previous iteration process by a first smoothing coefficient, to obtain a first parameter set;

multiply the student model in the current iteration process by a second smoothing coefficient, to obtain a second parameter set, a value obtained by adding the first smoothing coefficient and the second smoothing coefficient being 1;

determine a sum of the first parameter set and the second parameter set as a parameter set of the teacher model in the current iteration process; and perform parameter update on the teacher model in the previous iteration process based on the parameter set of the teacher model in the current iteration process, to obtain the teacher model in the current iteration process.

In some embodiments, the third obtaining unit is configured to:

respectively determine the first encoder network and the first abstractor network in the student model in the current iteration process as the encoder network and the abstractor network; or respectively determine the second encoder network and the second abstractor network in the teacher model in the current iteration process as the encoder network and the abstractor network.

In some embodiments, the signal processing module 503 is configured to:

perform text-to-speech conversion on the audio signal of the target object based on the generalized feature of the target component, and output text information corresponding to the audio signal of the target object; or perform voiceprint recognition on the audio signal of the target object based on the generalized feature of the target component, and output a voiceprint recognition result corresponding to the audio signal of the target object; or generate a response speech corresponding to the audio signal of the target object based on the generalized feature of the target component, and output the response speech.

All of the above technical solutions are combined randomly to form embodiments of this application. Details are not described herein again.

When the audio signal processing apparatus provided in the foregoing embodiments processes an audio signal, the division of the foregoing functional modules is merely used as an example for description. In application, the foregoing functions may be assigned to and completed by different functional modules as required. That is, an internal structure of the electronic device may be divided into different functional modules to complete all or some of the functions described above. Besides, the audio signal processing apparatus provided in the foregoing embodiments and the embodiments of the audio signal processing method belong to the same concept. For the specific implementation process, reference may be made to the embodiments of the audio signal processing method, and details are not described herein again. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 6:
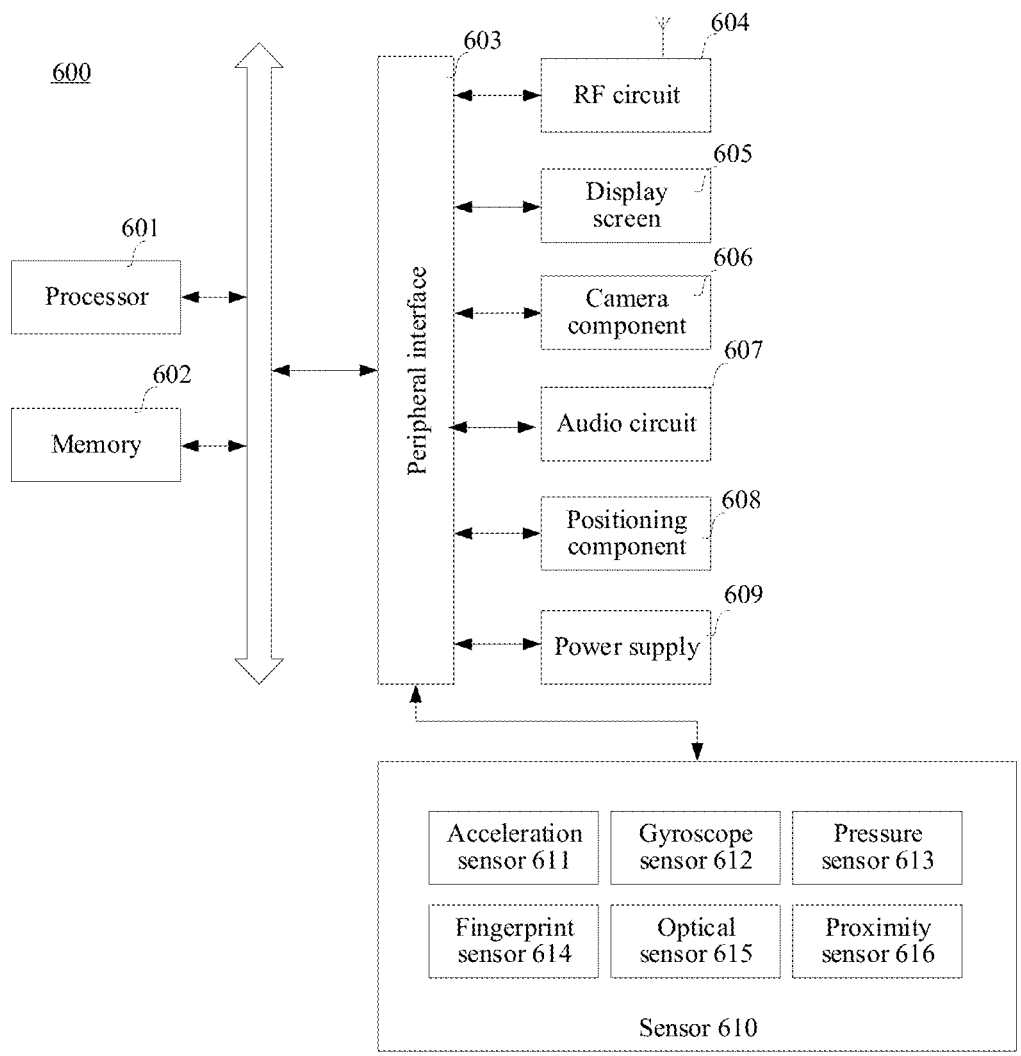
FIG. 6 is a schematic structural diagram of a terminal according to an embodiment of this application.

In some embodiments, the electronic device involved in the embodiments of this application is a terminal. FIG. 6 is a schematic structural diagram of a terminal according to an embodiment of this application. Referring to FIG. 6, the terminal 600 is a smartphone, a tablet computer, an MP3 player, an MP4 player, a notebook computer, or a desktop computer. The terminal 600 may also be referred to as user equipment, a portable terminal, a laptop terminal, a desktop terminal, or the like.

Generally, the terminal 600 includes a processor 601 and a memory 602.

The processor 601 includes one or more processing cores, for example, a 4-core processor or an 8-core processor. The processor 601 is implemented in at least one hardware form of a DSP, a field-programmable gate array (FPGA), and a programmable logic array (PLA). The processor 601 further includes a main processor and a coprocessor. The main processor is configured to process data in an awake state, also referred to as a central processing unit (CPU); and the coprocessor is a low-power processor configured to process data in a standby state. In some embodiments, the processor 601 is integrated with a graphics processing unit (GPU). The GPU is configured to render and draw content that needs to be displayed on a display screen. In some embodiments, the processor 601 further includes an AI processor. The AI processor is configured to process a computing operation related to machine learning.

The memory 602 includes one or more non-transitory computer-readable storage media. The non-transitory computer-readable storage medium is non-transient. The memory 602 may further include a high-speed random access memory (RAM) and a non-volatile memory, for example, one or more disk storage devices or flash memory devices. In some embodiments, a non-transitory computer-readable storage medium in the memory 602 is configured to store at least one program code, and the at least one program code is configured to be executed by the processor 601 to implement the following steps:

performing embedding processing on a mixed audio signal, to obtain an embedding feature of the mixed audio signal;

performing generalized feature extraction on the embedding feature, to obtain a generalized feature of a target component in the mixed audio signal, the target component being corresponding to an audio signal of a target object in the mixed audio signal; and performing audio signal processing based on the generalized feature of the target component.

In some embodiments, the at least one program code is configured to be executed by the processor 601 to implement the following step:

mapping the mixed audio signal to an embedding space, to obtain the embedding feature.

In some embodiments, the at least one program code is configured to be executed by the processor 601 to implement the following step:

performing recursive weighting processing on the embedding feature, to obtain the generalized feature of the target component.

In some embodiments, the at least one program code is configured to be executed by the processor 601 to implement the following steps:

inputting the mixed audio signal into an encoder network, and performing embedding processing on the mixed audio signal by using the encoder network, to obtain the embedding feature of the mixed audio signal.

In some embodiments, the at least one program code is configured to be executed by the processor 601 to implement the following steps:

inputting the embedding feature into an abstractor network, and performing generalized feature extraction on the embedding feature by using the abstractor network, to obtain the generalized feature of the target component in the mixed audio signal.

In some embodiments, the abstractor network is an autoregressive model, and the at least one program code is configured to be executed by the processor 601 to implement the following steps: inputting the embedding feature into the autoregressive model, and performing recursive weighting processing on the embedding feature by using the autoregressive model, to obtain the generalized feature of the target component.

In some embodiments, the at least one program code is configured to be executed by the processor 601 to implement the following step:

performing collaborative iterative training on a teacher model and a student model based on an unlabeled sample mixed signal, to obtain the encoder network and the abstractor network, where the student model includes a first encoder network and a first abstractor network, the teacher model includes a second encoder network and a second abstractor network, an output of the first encoder network is used as an input of the first abstractor network, an output of the second encoder network is used as an input of the second abstractor network, and the teacher model in each iteration process is obtained by weighting the teacher model in a previous iteration process and the student model in the current iteration process.

In some embodiments, the at least one program code is configured to be executed by the processor 601 to implement the following steps:

obtaining, in any iteration process, the teacher model in the current iteration process based on the student model in the current iteration process and the teacher model in a previous iteration process;

respectively inputting the unlabeled sample mixed signal into the teacher model and the student model in the current iteration process, and respectively outputting a teacher generalized feature and a student generalized feature of a target component in the sample mixed signal;

obtaining a loss function value of the current iteration process based on at least one of the sample mixed signal, the teacher generalized feature, or the student generalized feature;

adjusting, when the loss function value does not meet a training end condition, a parameter of the student model to obtain the student model in a next iteration process, and performing the next iteration process based on the student model in the next iteration process; and obtaining the encoder network and the abstractor network based on the student model or the teacher model in the current iteration process when the loss function value meets the training end condition.

In some embodiments, the at least one program code is configured to be executed by the processor 601 to implement the following steps:

obtaining an MSE between the teacher generalized feature and the student generalized feature;

obtaining an MI value between the sample mixed signal and the student generalized feature; and determining at least one of the MSE or the MI value as the loss function value of the current iteration process.

In some embodiments, the training end condition is that the MSE does not decrease in a first target quantity of consecutive iteration processes; or the training end condition is that the MSE is less than or equal to a first target threshold and the MI value is greater than or equal to a second target threshold; or the training end condition is that a quantity of iterations reaches a second target quantity.

The at least one program code is configured to be executed by the processor 601 to implement the following steps:

multiplying a parameter set of the teacher model in the previous iteration process by a first smoothing coefficient, to obtain a first parameter set;

multiplying the student model in the current iteration process by a second smoothing coefficient, to obtain a second parameter set, a value obtained by adding the first smoothing coefficient and the second smoothing coefficient being 1;

determining a sum of the first parameter set and the second parameter set as a parameter set of the teacher model in the current iteration process; and performing parameter update on the teacher model in the previous iteration process based on the parameter set of the teacher model in the current iteration process, to obtain the teacher model in the current iteration process.

The at least one program code is configured to be executed by the processor 601 to implement the following steps:

respectively determining the first encoder network and the first abstractor network in the student model in the current iteration process as the encoder network and the abstractor network; or respectively determining the second encoder network and the second abstractor network in the teacher model in the current iteration process as the encoder network and the abstractor network.

The at least one program code is configured to be executed by the processor 601 to implement the following steps:

performing text-to-speech conversion on the audio signal of the target object based on the generalized feature of the target component, and outputting text information corresponding to the audio signal of the target object; or performing voiceprint recognition on the audio signal of the target object based on the generalized feature of the target component, and outputting a voiceprint recognition result corresponding to the audio signal of the target object; or generating a response speech corresponding to the audio signal of the target object based on the generalized feature of the target component, and outputting the response speech.

In some embodiments, the terminal 600 may include a peripheral interface 603 and at least one peripheral. The processor 601, the memory 602, and the peripheral interface 603 are connected through a bus or a signal cable. Each peripheral is connected to the peripheral interface 603 through a bus, a signal cable, or a circuit board. Specifically, the peripheral device includes: at least one of a radio frequency (RF) circuit 604, a touch display screen 605, a camera component 606, an audio circuit 607, a positioning component 608, or a power supply 609.

The peripheral interface 603 may be configured to connect at least one peripheral related to input/output (I/O) to the processor 601 and the memory 602. In some embodiments, the processor 601, the memory 602, and the peripheral interface 603 are integrated on the same chip or the same circuit board. In some other embodiments, any one or two of the processor 601, the memory 602, and the peripheral interface 603 are implemented on an independent chip or circuit board. This is not limited in this embodiment.

The RF circuit 604 is configured to receive and transmit an RF signal, which is also referred to as an electromagnetic signal. The RF circuit 604 communicates with a communication network and another communication device by using the electromagnetic signal. The RF circuit 604 converts an electric signal into an electromagnetic signal for transmission, or converts a received electromagnetic signal into an electric signal. Optionally, the RF circuit 604 includes: an antenna system, an RF transceiver, one or more amplifiers, a tuner, an oscillator, a DSP, a codec chip set, a subscriber identity module card, and the like. the RF circuit 604 may communicate with other terminals through at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF circuit 604 further includes a circuit related to near field communication (NFC), and this is not limited in this application.

The display screen 605 is configured to display a user interface (UI). The UI may include a graph, text, an icon, a video, and any combination thereof. When the display screen 605 is a touch display screen, the display screen 605 also has a capability of collecting a touch signal on or above a surface of the display screen 605. The touch signal may be inputted to the processor 601 for processing as a control signal. In this case, the display screen 605 is further configured to provide a virtual button and/or a virtual keyboard, which is also referred to as a soft button and/or a soft keyboard. In some embodiments, there is one display screen 605, disposed on a front panel of the terminal 600. In some other embodiments, there are at least two display screens 605, disposed on different surfaces of the terminal 600 respectively or in a folded design. In still other embodiments, the display screen 605 is a flexible display screen disposed on a curved surface or a folded surface of the terminal 600. Even, the display screen 605 is further set in a non-rectangular irregular pattern, namely, a special-shaped screen. The display screen 605 is manufactured by using a material such as a liquid crystal display (LCD) or an organic light-emitting diode (OLED).

The camera component 606 is configured to acquire images or videos. Optionally, the camera component 606 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to implement background blur through fusion of the main camera and the depth-of-field camera, panoramic photographing and virtual reality (VR) photographing through fusion of the main camera and the wide-angle camera, or other fusion photographing functions. In some embodiments, the camera component 606 further includes a flash. The flash is a single color temperature flash, or a double color temperature flash. The double color temperature flash is a combination of a warm light flash and a cold light flash, and is used for light compensation under different color temperatures.

The audio circuit 607 includes a microphone and a speaker. The microphone is configured to collect sound waves of a user and an environment, and convert the sound waves into electric signals and input the electric signals into the processor 601 for processing, or input the electric signals into the RF circuit 604 to implement speech communication. For the purpose of stereo acquisition or noise reduction, there are a plurality of microphones, disposed at different parts of the terminal 600 respectively. The microphone is further an array microphone or an omni-directional acquisition microphone. The speaker is configured to convert electric signals from the processor 601 or the RF circuit 604 into sound waves. The speaker is a conventional thin-film speaker, or a piezoelectric ceramic speaker. When the speaker is the piezoelectric ceramic speaker, electrical signals not only are converted into sound waves that can be heard by human, but also are converted into sound waves that cannot be heard by human for ranging and other uses. In some embodiments, the audio circuit 607 further includes an earphone jack.

The positioning component 608 is configured to determine a current geographic location of the terminal 600, to implement navigation or a location-based service (LBS). The positioning component 608 is a positioning component based on the Global Positioning System (GPS) of the United States, the BeiDou system of China, the GLONASS System of Russia, or the GALILEO System of the European Union.

The power supply 609 is configured to supply power to components in the terminal 600. The power supply 609 is an alternating current, a direct current, a disposable battery, or a rechargeable battery. When the power supply 609 includes a rechargeable battery, the rechargeable battery is a wired rechargeable battery or a wireless rechargeable battery. The rechargeable battery is further configured to support a fast charge technology.

In some embodiments, the terminal 600 further includes one or more sensors 610. The one or more sensors 610 include, but are not limited to, an acceleration sensor 611, a gyroscope sensor 612, a pressure sensor 613, a fingerprint sensor 614, an optical sensor 615, and a proximity sensor 616.

The acceleration sensor 611 is configured to detect accelerations on three coordinate axes of a coordinate system established by the terminal 600. For example, the acceleration sensor 611 is configured to detect components of the gravity acceleration on the three coordinate axes. The processor 601 may control, according to a gravity acceleration signal acquired by the acceleration sensor 611, the touch display screen 605 to display the UI in a frame view or a portrait view. The acceleration sensor 611 is further configured to acquire motion data of a game or a user.

The gyroscope sensor 612 is configured to detect a body direction and a rotation angle of the terminal 600. The gyroscope sensor 612 is configured to acquire a 3D action of the user on the terminal 600 together with the acceleration sensor 611. The processor 601 implements the following functions according to data collected by the gyroscope sensor 612: motion sensing (for example, the UI is changed according to a tilt operation of the user), image stabilization during shooting, game control, and inertial navigation.

The pressure sensor 613 is disposed on a side frame of the terminal 600 and/or a lower layer of the touch display screen 605. When the pressure sensor 613 is disposed at the side frame of the terminal 600, a holding signal of the user on the terminal 600 is detected. The processor 601 performs left and right hand recognition or a quick operation according to the holding signal collected by the pressure sensor 613. When the pressure sensor 613 is disposed on the low layer of the touch display screen 605, the processor 601 controls, according to a pressure operation of the user on the display screen 605, an operable control on the UI. The operable control includes at least one of a button control, a scroll bar control, an icon control, or a menu control.

The fingerprint sensor 614 is configured to collect a fingerprint of a user, and the processor 601 recognizes an identity of the user according to the fingerprint collected by the fingerprint sensor 614, or the fingerprint sensor 614 recognizes the identity of the user based on the collected fingerprint. When the identity of the user is recognized as credible, the processor 601 authorizes the user to perform a related sensitive operation. The sensitive operation includes screen unlocking, viewing of encrypted information, software downloading, payment, setting changing, or the like. The fingerprint sensor 614 is disposed on a front face, a back face, or a side face of the terminal 600. When a physical button or a vendor logo is disposed on the terminal 600, the fingerprint sensor 614 is integrated together with the physical button or the vendor logo.

The optical sensor 615 is configured to acquire ambient light intensity. In an embodiment, the processor 601 controls display brightness of the touch display screen 605 according to the ambient light intensity acquired by the optical sensor 615. Specifically, when the ambient light intensity is relatively high, the display brightness of the touch display 605 is increased. When the ambient light intensity is relatively low, the display brightness of the touch display 605 is reduced. In another embodiment, the processor 601 further dynamically adjusts a camera parameter of the camera component 606 according to the ambient light intensity acquired by the optical sensor 615.

The proximity sensor 616, also referred to as a distance sensor, is generally disposed on the front panel of the terminal 600. The proximity sensor 616 is configured to collect a distance between the user and the front surface of the terminal 600. In an embodiment, when the proximity sensor 616 detects that the distance between the user and the front surface of the terminal 600 gradually becomes small, the touch display screen 605 is controlled by the processor 601 to switch from a screen-on state to a screen-off state. When the proximity sensor 616 detects that the distance between the user and the front surface of the terminal 600 gradually increases, the touch display screen 605 is controlled by the processor 601 to switch from the screen-off state to the screen-on state.

A person skilled in the art understands that the structure shown in FIG. 6 does not constitute a limitation to the terminal 600, and the terminal may include more or fewer components than those shown in the figure, or some components may be combined, or a different component arrangement may be used.

Figure 7:
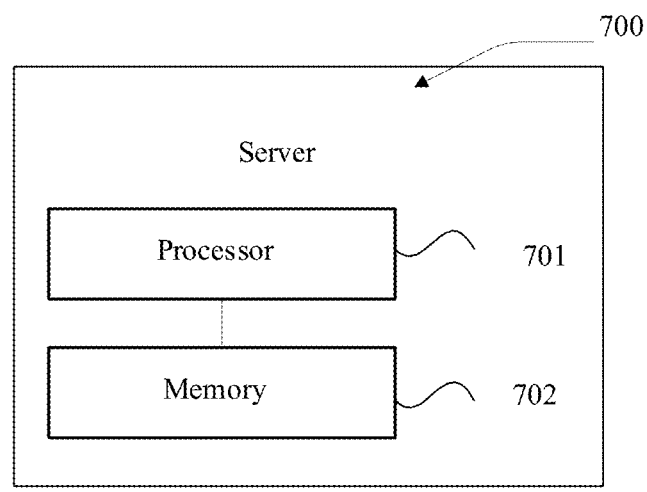
FIG. 7 is a schematic structural diagram of a server according to an embodiment of this application.

In some embodiments, the electronic device involved in the embodiments of this application is a server. FIG. 7 is a schematic structural diagram of a server according to an embodiment of this application. Referring to FIG. 7, the server 700 may vary greatly because a configuration or performance varies, and includes one or more processors (CPU) 701 and one or more memories 702. The memory 702 stores at least one program code, and the at least one program code is loaded and executed by the processor 701 to implement the following steps:

performing embedding processing on a mixed audio signal, to obtain an embedding feature of the mixed audio signal;

performing generalized feature extraction on the embedding feature, to obtain a generalized feature of a target component in the mixed audio signal, the target component being corresponding to an audio signal of a target object in the mixed audio signal; and performing audio signal processing based on the generalized feature of the target component.

In some embodiments, the at least one program code is configured to be executed by the processor 701 to implement the following step:

mapping the mixed audio signal to an embedding space, to obtain the embedding feature.

In some embodiments, the at least one program code is configured to be executed by the processor 701 to implement the following step:

performing recursive weighting processing on the embedding feature, to obtain the generalized feature of the target component.

In some embodiments, the at least one program code is configured to be executed by the processor 701 to implement the following steps:

inputting the mixed audio signal into an encoder network, and performing embedding processing on the mixed audio signal by using the encoder network, to obtain the embedding feature of the mixed audio signal.

In some embodiments, the at least one program code is configured to be executed by the processor 701 to implement the following steps:

inputting the embedding feature into an abstractor network, and performing generalized feature extraction on the embedding feature by using the abstractor network, to obtain the generalized feature of the target component in the mixed audio signal.

In some embodiments, the abstractor network is an autoregressive model, and the at least one program code is configured to be executed by the processor 701 to implement the following steps: inputting the embedding feature into the autoregressive model, and performing recursive weighting processing on the embedding feature by using the autoregressive model, to obtain the generalized feature of the target component.

In some embodiments, the at least one program code is configured to be executed by the processor 701 to implement the following steps:

performing collaborative iterative training on a teacher model and a student model based on an unlabeled sample mixed signal, to obtain the encoder network and the abstractor network, where the student model includes a first encoder network and a first abstractor network, the teacher model includes a second encoder network and a second abstractor network, an output of the first encoder network is used as an input of the first abstractor network, an output of the second encoder network is used as an input of the second abstractor network, and the teacher model in each iteration process is obtained by weighting the teacher model in a previous iteration process and the student model in the current iteration process.

In some embodiments, the at least one program code is configured to be executed by the processor 701 to implement the following steps:

obtaining, in any iteration process, the teacher model in the current iteration process based on the student model in the current iteration process and the teacher model in a previous iteration process;

respectively inputting the unlabeled sample mixed signal into the teacher model and the student model in the current iteration process, and respectively outputting a teacher generalized feature and a student generalized feature of a target component in the sample mixed signal;

obtaining a loss function value of the current iteration process based on at least one of the sample mixed signal, the teacher generalized feature, or the student generalized feature;

adjusting, when the loss function value does not meet a training end condition, a parameter of the student model to obtain the student model in a next iteration process, and performing the next iteration process based on the student model in the next iteration process; and obtaining the encoder network and the abstractor network based on the student model or the teacher model in the current iteration process when the loss function value meets the training end condition.

In some embodiments, the at least one program code is configured to be executed by the processor 701 to implement the following steps:

obtaining an MSE between the teacher generalized feature and the student generalized feature;

obtaining an MI value between the sample mixed signal and the student generalized feature; and determining at least one of the MSE or the MI value as the loss function value of the current iteration process.

In some embodiments, the training end condition is that the MSE does not decrease in a first target quantity of consecutive iteration processes; or the training end condition is that the MSE is less than or equal to a first target threshold and the MI value is greater than or equal to a second target threshold; or the training end condition is that a quantity of iterations reaches a second target quantity.

the at least one program code is configured to be executed by the processor 701 to implement the following steps:

multiplying a parameter set of the teacher model in the previous iteration process by a first smoothing coefficient, to obtain a first parameter set;

multiplying the student model in the current iteration process by a second smoothing coefficient, to obtain a second parameter set, a value obtained by adding the first smoothing coefficient and the second smoothing coefficient being 1;

determining a sum of the first parameter set and the second parameter set as a parameter set of the teacher model in the current iteration process; and performing parameter update on the teacher model in the previous iteration process based on the parameter set of the teacher model in the current iteration process, to obtain the teacher model in the current iteration process.

The at least one program code is configured to be executed by the processor 701 to implement the following steps:

respectively determining the first encoder network and the first abstractor network in the student model in the current iteration process as the encoder network and the abstractor network; or respectively determining the second encoder network and the second abstractor network in the teacher model in the current iteration process as the encoder network and the abstractor network.

The at least one program code is configured to be executed by the processor 701 to implement the following steps:

performing text-to-speech conversion on the audio signal of the target object based on the generalized feature of the target component, and outputting text information corresponding to the audio signal of the target object; or performing voiceprint recognition on the audio signal of the target object based on the generalized feature of the target component, and outputting a voiceprint recognition result corresponding to the audio signal of the target object; or generating a response speech corresponding to the audio signal of the target object based on the generalized feature of the target component, and outputting the response speech.

Certainly, the server 700 further has a wired or wireless network interface, a keyboard, an input/output interface and other components to facilitate input/output. The server 700 further includes other components for implementing device functions. Details are not described herein.

In an exemplary embodiment, a non-transitory computer-readable storage medium, for example, a memory including at least one program code is further provided. The at least one program code may be executed by a processor in an electronic device to implement the following steps:

performing embedding processing on a mixed audio signal, to obtain an embedding feature of the mixed audio signal;

performing generalized feature extraction on the embedding feature, to obtain a generalized feature of a target component in the mixed audio signal, the target component being corresponding to an audio signal of a target object in the mixed audio signal; and performing audio signal processing based on the generalized feature of the target component.

In some embodiments, the at least one program code is configured to be executed by the processor in the electronic device to implement the following step:

mapping the mixed audio signal to an embedding space, to obtain the embedding feature.

In some embodiments, the at least one program code is configured to be executed by the processor in the electronic device to implement the following step:

performing recursive weighting processing on the embedding feature, to obtain the generalized feature of the target component.

In some embodiments, the at least one program code is configured to be executed by the processor in the electronic device to implement the following steps:

inputting the mixed audio signal into an encoder network, and performing embedding processing on the mixed audio signal by using the encoder network, to obtain the embedding feature of the mixed audio signal.

In some embodiments, the at least one program code is configured to be executed by the processor in the electronic device to implement the following steps:

inputting the embedding feature into an abstractor network, and performing generalized feature extraction on the embedding feature by using the abstractor network, to obtain the generalized feature of the target component in the mixed audio signal.

In some embodiments, the abstractor network is an autoregressive model, and the at least one program code is configured to be executed by the processor in the electronic device to implement the following steps: inputting the embedding feature into the autoregressive model, and performing recursive weighting processing on the embedding feature by using the autoregressive model, to obtain the generalized feature of the target component.

In some embodiments, the at least one program code is configured to be executed by the processor in the electronic device to implement the following steps:

performing collaborative iterative training on a teacher model and a student model based on an unlabeled sample mixed signal, to obtain the encoder network and the abstractor network, where the student model includes a first encoder network and a first abstractor network, the teacher model includes a second encoder network and a second abstractor network, an output of the first encoder network is used as an input of the first abstractor network, an output of the second encoder network is used as an input of the second abstractor network, and the teacher model in each iteration process is obtained by weighting the teacher model in a previous iteration process and the student model in the current iteration process.

In some embodiments, the at least one program code is configured to be executed by the processor in the electronic device to implement the following steps:

obtaining, in any iteration process, the teacher model in the current iteration process based on the student model in the current iteration process and the teacher model in a previous iteration process;

respectively inputting the unlabeled sample mixed signal into the teacher model and the student model in the current iteration process, and respectively outputting a teacher generalized feature and a student generalized feature of a target component in the sample mixed signal;

obtaining a loss function value of the current iteration process based on at least one of the sample mixed signal, the teacher generalized feature, or the student generalized feature;

adjusting, when the loss function value does not meet a training end condition, a parameter of the student model to obtain the student model in a next iteration process, and performing the next iteration process based on the student model in the next iteration process; and obtaining the encoder network and the abstractor network based on the student model or the teacher model in the current iteration process when the loss function value meets the training end condition.

In some embodiments, the at least one program code is configured to be executed by the processor in the electronic device to implement the following steps:

obtaining an MSE between the teacher generalized feature and the student generalized feature;

obtaining an MI value between the sample mixed signal and the student generalized feature; and determining at least one of the MSE or the MI value as the loss function value of the current iteration process.

In some embodiments, the training end condition is that the MSE does not decrease in a first target quantity of consecutive iteration processes; or the training end condition is that the MSE is less than or equal to a first target threshold and the MI value is greater than or equal to a second target threshold; or the training end condition is that a quantity of iterations reaches a second target quantity.

the at least one program code is configured to be executed by the processor in the electronic device to implement the following steps:

multiplying a parameter set of the teacher model in the previous iteration process by a first smoothing coefficient, to obtain a first parameter set;

multiplying the student model in the current iteration process by a second smoothing coefficient, to obtain a second parameter set, a value obtained by adding the first smoothing coefficient and the second smoothing coefficient being 1;

determining a sum of the first parameter set and the second parameter set as a parameter set of the teacher model in the current iteration process; and performing parameter update on the teacher model in the previous iteration process based on the parameter set of the teacher model in the current iteration process, to obtain the teacher model in the current iteration process.

The at least one program code is configured to be executed by the processor in the electronic device to implement the following steps:

respectively determining the first encoder network and the first abstractor network in the student model in the current iteration process as the encoder network and the abstractor network; or respectively determining the second encoder network and the second abstractor network in the teacher model in the current iteration process as the encoder network and the abstractor network.

The at least one program code is configured to be executed by the processor in the electronic device to implement the following steps:

performing text-to-speech conversion on the audio signal of the target object based on the generalized feature of the target component, and outputting text information corresponding to the audio signal of the target object; or performing voiceprint recognition on the audio signal of the target object based on the generalized feature of the target component, and outputting a voiceprint recognition result corresponding to the audio signal of the target object; or generating a response speech corresponding to the audio signal of the target object based on the generalized feature of the target component, and outputting the response speech.

For example, the non-transitory computer-readable storage medium is a read-only memory (ROM), a RAM, a compact disc read-only memory (CD-ROM), a magnetic tape, a floppy disk, an optical data storage device, or the like.

A person of ordinary skill in the art understands that all or some of the steps of the foregoing embodiments are implemented by hardware, or implemented a program instructing related hardware. The program is stored in a non-transitory computer-readable storage medium. The storage medium is a ROM, a magnetic disk, or an optical disc.

The foregoing descriptions are merely embodiments of this application, but are not intended to limit this application. Any modification, equivalent replacement, or improvement made within the spirit and principle of this application shall fall within the protection scope of this application.

What is claimed is:

1. An audio signal processing method performed by an electronic device, the method comprising:

performing embedding processing on a mixed audio signal by mapping the mixed audio signal from a low-dimensional space to a high-dimensional embedding space using an encoder network, to obtain an embedding feature of the mixed audio signal in the embedding space;

performing generalized feature extraction on the embedding feature using an abstractor network, to obtain a generalized feature of a target component in the mixed audio signal, the target component corresponding to an audio signal of a target object in the mixed audio signal, wherein a dimension of the generalized feature is lower than a dimension of embedding feature of the mixed audio signal; and performing audio signal processing on the mixed audio signal based on the generalized feature of the target component to obtain information of the audio signal of the target object in the mixed audio signal used for separating the audio signal of the target object from the mixed audio signal, wherein the encoder network and the abstractor network are obtained by collaboratively training on a teacher model and a student model through unsupervised machine learning using unlabeled sample mixed signals in multiple iterations, wherein the student model comprises a first encoder network and a first abstractor network, the teacher model comprises a second encoder network and a second abstractor network, an output of the first encoder network is used as an input of the first abstractor network, and an output of the second encoder network is used as an input of the second abstractor network, and the teacher model in each iteration process is obtained by weighting the teacher model in a previous iteration process and the student model in the current iteration process.

2. The method according to claim 1, wherein the performing generalized feature extraction on the embedding feature, to obtain a generalized feature of a target component in the mixed audio signal comprises:
performing recursive weighting processing on the embedding feature, to obtain the generalized feature of the target component.

3. The method according to claim 1, wherein the abstractor network is an autoregressive model, and the inputting the embedding feature into an abstractor network, and performing generalized feature extraction on the embedding feature by using the abstractor network, to obtain the generalized feature of the target component in the mixed audio signal comprises:
inputting the embedding feature into the autoregressive model, and performing recursive weighting processing on the embedding feature by using the autoregressive model, to obtain the generalized feature of the target component.

4. The method according to claim 1, wherein the collaboratively training on a teacher model and a student model based on an unlabeled sample mixed signal, to obtain the encoder network and the abstractor network comprises:
obtaining, in any iteration process, the teacher model in the current iteration process based on the student model in the current iteration process and the teacher model in a previous iteration process;
respectively inputting the unlabeled sample mixed signal into the teacher model and the student model in the current iteration process, and respectively outputting a teacher generalized feature and a student generalized feature of a target component in the sample mixed signal;
obtaining a loss function value of the current iteration process based on at least one of the sample mixed signal, the teacher generalized feature, or the student generalized feature;
adjusting, when the loss function value does not meet a training end condition, a parameter of the student model to obtain the student model in a next iteration process, and performing the next iteration process based on the student model in the next iteration process; and
obtaining the encoder network and the abstractor network based on the student model or the teacher model in the current iteration process when the loss function value meets the training end condition.

5. The method according to claim 4, wherein the obtaining a loss function value of the current iteration process based on at least one of the sample mixed signal, the teacher generalized feature, or the student generalized feature comprises:
obtaining a mean squared error (MSE) between the teacher generalized feature and the student generalized feature;
obtaining a mutual information (MI) value between the sample mixed signal and the student generalized feature; and
determining at least one of the MSE or the MI value as the loss function value of the current iteration process.

6. The method according to claim 5, wherein the training end condition is that the MSE does not decrease in a first target quantity of consecutive iteration processes; or
the training end condition is that the MSE is less than or equal to a first target threshold and the MI value is greater than or equal to a second target threshold; or
the training end condition is that a quantity of iterations reaches a second target quantity.

7. The method according to claim 4, wherein the obtaining the teacher model in the current iteration process based on the student model in the current iteration process and the teacher model in a previous iteration process comprises:
multiplying a parameter set of the teacher model in the previous iteration process by a first smoothing coefficient, to obtain a first parameter set;
multiplying the student model in the current iteration process by a second smoothing coefficient, to obtain a second parameter set, a value obtained by adding the first smoothing coefficient and the second smoothing coefficient being 1;
determining a sum of the first parameter set and the second parameter set as a parameter set of the teacher model in the current iteration process; and
performing parameter update on the teacher model in the previous iteration process based on the parameter set of the teacher model in the current iteration process, to obtain the teacher model in the current iteration process.

8. The method according to claim 4, wherein the obtaining the encoder network and the abstractor network based on the student model or the teacher model in the current iteration process comprises:
respectively determining the first encoder network and the first abstractor network in the student model in the current iteration process as the encoder network and the abstractor network; or
respectively determining the second encoder network and the second abstractor network in the teacher model in the current iteration process as the encoder network and the abstractor network.

9. The method according to claim 1, wherein the performing audio signal processing on the mixed audio signal based on the generalized feature of the target component to obtain information of the audio signal of the target object in the mixed audio signal comprises:
performing speech-to-text conversion on the audio signal of the target object based on the generalized feature of the target component, and outputting text information corresponding to the audio signal of the target object; or
performing voiceprint recognition on the audio signal of the target object based on the generalized feature of the target component, and outputting a voiceprint recognition result corresponding to the audio signal of the target object; or
generating a response speech corresponding to the audio signal of the target object based on the generalized feature of the target component, and outputting the response speech.

10. An electronic device, comprising one or more processors and one or more memories, the one or more memories storing at least one program code, the at least one program code being loaded and executed by the one or more processors of the electronic device and causing the electronic device to perform an audio signal processing method including:

performing embedding processing on a mixed audio signal by mapping the mixed audio signal from a low-dimensional space to a high-dimensional embedding space using an encoder network, to obtain an embedding feature of the mixed audio signal in the embedding space;

performing generalized feature extraction on the embedding feature using an abstractor network, to obtain a generalized feature of a target component in the mixed audio signal, the target component corresponding to an audio signal of a target object in the mixed audio signal, wherein a dimension of the generalized feature is lower than a dimension of embedding feature of the mixed audio signal; and performing audio signal processing on the mixed audio signal based on the generalized feature of the target component to obtain information of the audio signal of the target object in the mixed audio signal used for separating the audio signal of the target object from the mixed audio signal, wherein the encoder network and the abstractor network are trained obtained by collaboratively training on a teacher model and a student model through unsupervised machine learning using unlabeled sample mixed signals in multiple iterations, wherein the student model comprises a first encoder network and a first abstractor network, the teacher model comprises a second encoder network and a second abstractor network, an output of the first encoder network is used as an input of the first abstractor network, and an output of the second encoder network is used as an input of the second abstractor network, and the teacher model in each iteration process is obtained by weighting the teacher model in a previous iteration process and the student model in the current iteration process.

11. The electronic device according to claim 10, wherein the performing generalized feature extraction on the embedding feature, to obtain a generalized feature of a target component in the mixed audio signal comprises:

performing recursive weighting processing on the embedding feature, to obtain the generalized feature of the target component.

12. The electronic device according to claim 10, wherein the performing audio signal processing on the mixed audio signal based on the generalized feature of the target component to obtain information of the audio signal of the target object in the mixed audio signal comprises:

performing speech-to-text conversion on the audio signal of the target object based on the generalized feature of the target component, and outputting text information corresponding to the audio signal of the target object; or performing voiceprint recognition on the audio signal of the target object based on the generalized feature of the target component, and outputting a voiceprint recognition result corresponding to the audio signal of the target object; or generating a response speech corresponding to the audio signal of the target object based on the generalized feature of the target component, and outputting the response speech.

13. A non-transitory computer-readable storage medium, storing at least one program code, the at least one program code being loaded and executed by a processor of an electronic device and causing the electronic device to perform an audio signal processing method including:

performing embedding processing on a mixed audio signal by mapping the mixed audio signal from a low-dimensional space to a high-dimensional embedding space using an encoder network, to obtain an embedding feature of the mixed audio signal in the embedding space;

performing generalized feature extraction on the embedding feature using an abstractor network, to obtain a generalized feature of a target component in the mixed audio signal, the target component corresponding to an audio signal of a target object in the mixed audio signal, wherein a dimension of the generalized feature is lower than a dimension of embedding feature of the mixed audio signal; and performing audio signal processing on the mixed audio signal based on the generalized feature of the target component to obtain information of the audio signal of the target object in the mixed audio signal used for separating the audio signal of the target object from the mixed audio signal, wherein the encoder network and the abstractor network are obtained by collaboratively training on a teacher model and a student model through unsupervised machine learning using unlabeled sample mixed signals in multiple iterations, wherein the student model comprises a first encoder network and a first abstractor network, the teacher model comprises a second encoder network and a second abstractor network, an output of the first encoder network is used as an input of the first abstractor network, and an output of the second encoder network is used as an input of the second abstractor network, and the teacher model in each iteration process is obtained by weighting the teacher model in a previous iteration process and the student model in the current iteration process.

14. The non-transitory computer-readable storage medium according to claim 13, wherein the performing generalized feature extraction on the embedding feature, to obtain a generalized feature of a target component in the mixed audio signal comprises:

performing recursive weighting processing on the embedding feature, to obtain the generalized feature of the target component.

15. The non-transitory computer-readable storage medium according to claim 13, wherein the performing audio signal processing on the mixed audio signal based on the generalized feature of the target component to obtain information of the audio signal of the target object in the mixed audio signal comprises:

performing speech-to-text conversion on the audio signal of the target object based on the generalized feature of the target component, and outputting text information corresponding to the audio signal of the target object; or performing voiceprint recognition on the audio signal of the target object based on the generalized feature of the target component, and outputting a voiceprint recognition result corresponding to the audio signal of the target object; or generating a response speech corresponding to the audio signal of the target object based on the generalized feature of the target component, and outputting the response speech.

* * * * *